(12) United States Patent
Pearlman et al.

(10) Patent No.: US 7,882,909 B2
(45) Date of Patent: Feb. 8, 2011

(54) PERSONAL VEHICLE

(75) Inventors: Jonathan L. Pearlman, Pittsburgh, PA (US); Rory Cooper, Gibsonia, PA (US)

(73) Assignee: University of Pittsburgh, Pittsburgh, PA (US)

( * ) Notice: Subject to any disclaimer, the term of this patent is extended or adjusted under 35 U.S.C. 154(b) by 580 days.

(21) Appl. No.: 11/901,137

(22) Filed: Sep. 14, 2007

(65) Prior Publication Data

US 2008/0066974 A1 Mar. 20, 2008

Related U.S. Application Data

(60) Provisional application No. 60/844,483, filed on Sep. 14, 2006.

(51) Int. Cl.
*B62D 61/10* (2006.01)

(52) U.S. Cl. .................. 180/23; 180/253; 180/907

(58) Field of Classification Search .......... 180/22, 180/23, 208, 253, 264, 65.1, 907, 12
See application file for complete search history.

(56) References Cited

U.S. PATENT DOCUMENTS

| | | | |
|---|---|---|---|
| 2,495,573 A | 1/1950 | Duke | |
| 2,635,703 A | 4/1953 | Goeller | |
| 2,978,053 A * | 4/1961 | Schmidt | 180/12 |
| 3,566,986 A * | 3/1971 | Udden | 180/21 |
| 4,019,402 A | 4/1977 | Leonheart | |
| 4,274,503 A | 6/1981 | Mackintosh | |
| 4,403,673 A * | 9/1983 | Ball | 180/214 |
| 4,513,832 A * | 4/1985 | Engman | 180/6.5 |
| 4,759,418 A * | 7/1988 | Goldenfeld et al. | 180/65.1 |
| 5,222,567 A * | 6/1993 | Broadhead et al. | 180/15 |
| 5,494,126 A * | 2/1996 | Meeker | 180/13 |
| 5,575,348 A | 11/1996 | Goertzen et al. | |
| 5,778,996 A * | 7/1998 | Prior et al. | 180/65.1 |
| 5,853,059 A | 12/1998 | Goertzen et al. | |
| 5,904,214 A | 5/1999 | Lin | |
| 5,937,704 A | 8/1999 | Shimizu et al. | |
| 5,937,959 A * | 8/1999 | Fujii et al. | 180/12 |
| 5,941,339 A | 8/1999 | Shimizu et al. | |
| 5,944,131 A | 8/1999 | Schaffner et al. | |
| 5,964,473 A | 10/1999 | Degonda et al. | |
| 6,053,273 A | 4/2000 | Shimizu et al. | |
| 6,053,781 A | 4/2000 | Littleton | |
| 6,125,962 A | 10/2000 | Shimizu et al. | |
| 6,196,343 B1 | 3/2001 | Strautnieks | |
| 6,199,647 B1 | 3/2001 | Schaffner et al. | |
| 6,209,670 B1 * | 4/2001 | Fernie et al. | 180/12 |
| 6,357,776 B1 | 3/2002 | Goertzen et al. | |
| 6,413,126 B1 | 7/2002 | Johnson | |
| 6,474,434 B1 | 11/2002 | Bech | |
| 6,481,514 B2 | 11/2002 | Takada | |

(Continued)

*Primary Examiner*—Paul N Dickson
*Assistant Examiner*—Timothy D Wilhelm
(74) *Attorney, Agent, or Firm*—David G. Oberdick

(57) ABSTRACT

A personal vehicle comprises a frame with a seat, two large, non-drive wheels connected by an axle at one end of the frame, an elongated swing arm attached to the axle, a pair of caster wheels connected to the frame opposite the large, non-drive wheels and a main drive wheel mounted to a fork and connected to the swing arm. The main drive wheel is located central the vehicle frame, intermediate the frame sides and intermediate frame front and rear sections.

15 Claims, 18 Drawing Sheets

U.S. PATENT DOCUMENTS

| | | | |
|---|---|---|---|
| 6,554,086 B1 * | 4/2003 | Goertzen et al. | 180/65.1 |
| 6,640,916 B2 | 11/2003 | Schaffner et al. | |
| 6,725,956 B1 * | 4/2004 | Lemire | 180/15 |
| 6,752,230 B1 * | 6/2004 | Huang | 180/209 |
| 6,938,711 B2 | 9/2005 | Kime | |
| 7,066,480 B2 | 6/2006 | Brichet et al. | |
| 7,389,835 B2 * | 6/2008 | Mulhern et al. | 180/22 |
| 7,413,038 B2 * | 8/2008 | Mulhern et al. | 180/22 |
| 7,562,903 B2 * | 7/2009 | Kramer et al. | 280/755 |
| 2005/0257966 A1 * | 11/2005 | Mulhern et al. | 180/65.1 |
| 2006/0053936 A1 | 3/2006 | Wancket | |
| 2008/0264702 A1 * | 10/2008 | Cheng | 180/22 |

* cited by examiner

PERSONAL VEHICLE

CROSS-REFERENCE TO RELATED APPLICATIONS

This application claims the benefit of U.S. Provisional Application No. 60/844,483, filed on Sep. 14, 2006, incorporated herein by reference.

STATEMENT REGARDING FEDERALLY SPONSORED RESEARCH OR DEVELOPMENT

The invention was made with government support under Federal Grant Numbers NSF EEC 0552351, DGE0333420 and H133E990001 by the National Science Foundation. The United States Government has certain rights to the invention.

FIELD OF THE INVENTION

The invention relates generally to a personal vehicle and more particularly relates to an personal vehicle with a central drive wheel and enhanced maneuverability on various types of terrain.

BACKGROUND OF THE INVENTION

Due to the aging baby-boom generation and improvements in healthcare, the average age of the US population is increasing and is projected to continue to increase for decades. The demand for assistive technologies such as electric powered wheelchairs ("EPW" or "EPWs") and scooters have kept close pace with the increasing elderly population, as demonstrated by the sharp increases in Medicare spending on these devices. Scooter and EPW use increased by an average of 25% between the years 2002 and 2003.

Currently, the devices available fall into two basic categories: (1) high-cost, highly maneuverable EPWs ($5000-$30,000) and (2) lower-cost scooters ($2000-$3000), technically known as power operated vehicles ("POV" or "POVs"). The POVs have less maneuverability and stability than the EPWs. POVs provide functional mobility in well-built, open spaces—such as shopping malls, paved roads and sidewalks. The POVs, however, provide little to no mobility in the home or over rough terrain. While EPWs can provide functional mobility in all locations, insurance companies typically will only reimburse the high cost of these devices if an individual cannot safely ambulate in their home. Further, one of the efforts to curb increasing healthcare costs has been to make EPW eligibility criteria more stringent, which has also restricted many individuals from receiving them.

Between 1969 and 1995, the use of wheelchairs has quadrupled (see FIG. 1). Survey results from non-institutionalized users, from the National Health Information Survey on Disability (NHIS-D, Phase 1 & Phase 2), taken between 1994-1997 reveal that there are 1.5 million manual wheelchair users, 155,000 EPW users, and 142,000 POV users. In summary, there were a total of 1.7 million mobility device users from 1994-1997 in the United States. More recent data, recorded by the Census Bureau's Survey of Income and Program Participation (or "SIPP"), estimated there were 2.3 million mobility device (MWC, EPW, and POV) users in 1999 (see FIG. 1). Using a linear extrapolation of this data, it is projected that 4.3 million mobility devices will be in use by the year 2010, 392,000 and 359,000 of which would be EPWs and POVs, respectively (see FIG. 2). This is likely a conservative estimate, considering the strong positive correlation between age and mobility device use, and the 76 million people retiring from the baby boomer generation, which will results in a rapid expansion of individuals over 65 years of age. Since POV use is more common than EPW use among individuals over the age of 65, the demand for POVs is likely to grow disproportionately compared to other wheeled mobility devices as the baby boomers retire.

A low cost, highly functional mobility vehicle, as provided in the present invention, addresses the swelling growth of medical expenditures in the US. Besides curbing medical expenditures, the large numbers of uninsured or underinsured individuals need to be able to obtain this technology to more fully participate in society. The incidence of this unmet need is startling. In 1990, 1 in 5 (or 20%) of individuals who needed assistive technologies could not procure such devices because of the high price and their lack of sufficient insurance. If the prices of these vehicles can be reduced, more people will be able to access these technologies.

Apart from the substantial need for low-cost mobility devices in the US, there is an enormous need for mobility devices in lower income countries where cost is the most important factor in determining whether a technology can be adopted. As the economies of these low income countries expand, as is occurring in India and China, powered mobility vehicles may soon be an option to allow older individuals or those with disabilities to become more integrated into society. However, the technology must be highly functional and low-cost, as is the present invention. Cost, beyond any other factor, such as maneuverability, comfort, fit, etc., defines the size of the market for mobility devices, as the actual need for the devices are overwhelming.

There are both technical and cost trade-offs for users when they are choosing or being prescribed either a POV (FIG. 3A) or an EPW (FIG. 3B). In terms of user safety, stability is one of the most important factors. Structurally, POVs are longer and narrower than most EPWs, which compromise lateral stability. At first glance, the POV design may appear to increase forward and rearward stability, but because the majority of the mass in the POV is towards the rear of the device, and is above the rear axle, rearward stability of POVs is typically worse than that of EPWs.

Adding to these structurally-related stability issues are the differences in the way the POVs and EPWs maneuver (see FIGS. 4A and 4B). Because of the front wheel steering, and the relatively long wheelbase, POVs make wide sweeping turns which subjects them to high lateral tipping forces (FIG. 4A, top arrow), significantly decreasing the stability of the devices. A similar turn, made by an EPW user, is much more stable because they turn with differential speed control of the wheels (see FIG. 4B, bottom arrow). When sharp turns (e.g., no forward velocity) are made, the EPW rotates about an axis, within its own footprint, resulting in little to no lateral tipping force, compared to the large lateral tipping forces on the POVs during sharp maneuvering. As the forward speed of the EPW increases, lateral force on the EPW increases (see FIG. 4B, bottom, arrow), but not typically to a degree which compromises the stability. Furthermore, most EPW controllers are programmable, allowing the turning speed during high forward velocities to be modified, and ameliorating the risk of lateral tipping during these maneuvers.

Apart from stability, maneuverability is a second critical factor currently affecting POVs and EPWs that impacts the functionality of each device. As discussed above, the structural design of the POVs requires them to make large sweeping turns (see FIG. 4A). This restricts functional use of the POV to larger open spaces than are necessary for EPWs. Because of this limitation, POV users cannot readily maneuver in their homes or workplaces. Daily tasks such as maneuvering in front of a desk, or within the confined space of most bathrooms would be possible with an EPW, but not with a POV. This is one of the primary reasons that POVs are provided strictly to individuals who have some ability to ambulate within their home.

A third critical factor for both the consumer and health insurers is the cost of the vehicle. While stability and maneuverability of POVs is lower compared to EPWs, POVs cost significantly less.

What is critically needed is a new personal vehicle which meets the needs of these individuals with disabilities or who otherwise have a mobility impairment (e.g., from advanced age), but is also low-cost, thus helping to curb rising healthcare costs. The present invention provides a low cost personal vehicle which performs similarly to an EPW, but is priced similarly to a POV.

SUMMARY OF THE INVENTION

An object of the present invention is to provide a Hybrid Power Operated Vehicle or 'HyPoV' that is produced at a low cost.

Yet another object of the present invention is to provide a HyPoV that provides functional mobility to users and meets the desires of the target population.

Still another object of the present invention is to provide a HyPoV that is lightweight.

Still another object of the present invention is to provide a HyPoV with an optional drum-cable steering system.

Still another object of the present invention is to provide a HyPoV with a boat-style, tiller or optional handlebar, steering system.

Still another object of the present invention is to provide a HyPoV with a leaf-spring, or torsion-spring suspension system.

Yet another object is to provide a HyPoV with a lockable arm-rest for torso readjustment by the user.

Yet another object is to provide a HyPoV with a controller housing location that will allow for shrouding the frame to provide an aesthetically pleasing appearance.

Yet another object is to provide a HyPoV with an optional foot-rest that can be parsed for separate left and right foot user adjustment.

Yet another object is to provide a HyPoV with an optional tilting seat.

Yet another object is to provide a HyPoV with an optional power steering system.

Therefore, what is provided in one preferred embodiment is a personal vehicle or HyPoV comprising an independent suspension for each caster wheel, which is linked through a lever system to the drive wheel, thereby increasing traction/maneuverability, a hub-motor style center drive wheel, lowering costs and complexity compared to EPWs and POVs; a manual steering tiller, requiring a less sophisticated (which can be upgraded to power steering), and lower cost controller; a short wheelbase and the ability for the device to turn around in its own footprint.

Specifically, in one preferred embodiment, the personal vehicle or HyPoV comprises a frame having a top and bottom side, two large non-drive wheels positioned at one end of the frame, wherein these two large wheels are connected to each other by an axle. Further provided are a pivot connection piece attached near a midpoint of the axle between the two large wheels, an elongated center swing-arm attached to the pivot connection piece at a first end and to a front portion of the frame at a second end, a drive wheel mounted in a fork, where the drive wheel is rigidly attached to the elongated center swing arm. The drive wheel comprises a hub-motor to provide the sole power to the personal vehicle. Two suspension links extend outwardly from the second end of the center swing arm. Two caster wheels are positioned in two wheel forks, wherein the wheel forks are rotatably attached to the suspension links, and, whereby the personal vehicle has improved maneuverability on rough terrain and when encountering obstacles.

Also included in the personal vehicle or HyPoV is a braking system for one or more of: the drive wheel, the large non-drive wheels and the caster wheels; a seat disposed on the top of the frame; a steering system; a steering tiller mounted on the seat; at least one battery; and a rotatable joint attached to an end of each suspension link. The rotatable joint permits each caster wheel to rotate 360 degrees.

In another embodiment, the personal vehicle of the present invention comprises a frame having a top and bottom side, two large non-drive wheels positioned at one end of the frame, wherein the two large wheels are connected to each other by an axle, a pivot connection piece attached to the axle, an elongated center swing arm having a slot defined therein attached to the pivot connection piece at a first end and to a front portion of the frame at a second end, wherein a channel is further defined within the center swing arm.

The personal vehicle further comprises a drive wheel mounted in a fork, the fork having a bearing and a shaft mounted thereto at a portion furthest from the drive wheel, wherein the shaft engages the slot and the bearing engages the channel, two suspension links extending outwardly from the second end of the center swing arm, a rotatable joint attached to the end of each suspension link, two caster wheels positioned in two wheel forks, wherein the wheel forks are rotatably attached to the rotatable joint to permit each caster wheel to rotate 360 degrees, and whereby the personal vehicle has improved maneuverability on rough terrain and when encountering obstacles.

In yet another preferred embodiment, the personal vehicle has an optional steering mechanism comprising a cylindrical upper steering drum directly connected to a steering handle operated by a user, a cylindrical lower steering drum attached to a drive motor shaft of the center drive wheel, cables wrapped around the upper cylindrical drum so that the upper cylindrical drum and the handlebars rotate in unison, and, cables wrapped around the lower cylindrical drum causing it and the center drive wheel to turn in unison.

In yet another preferred embodiment, the personal vehicle or HyPoV of this invention includes a leaf-spring or torsion-spring suspension for increased rigidity, fewer components and reduced manufacturing costs. Yet another preferred embodiment provides a modified tiller for better balance that users with less muscle control or reduced functionality may be able to operate by pushing and/or pulling on a handlebar for easier turning.

DETAILED DESCRIPTION OF PREFERRED EMBODIMENTS

Figure 1:
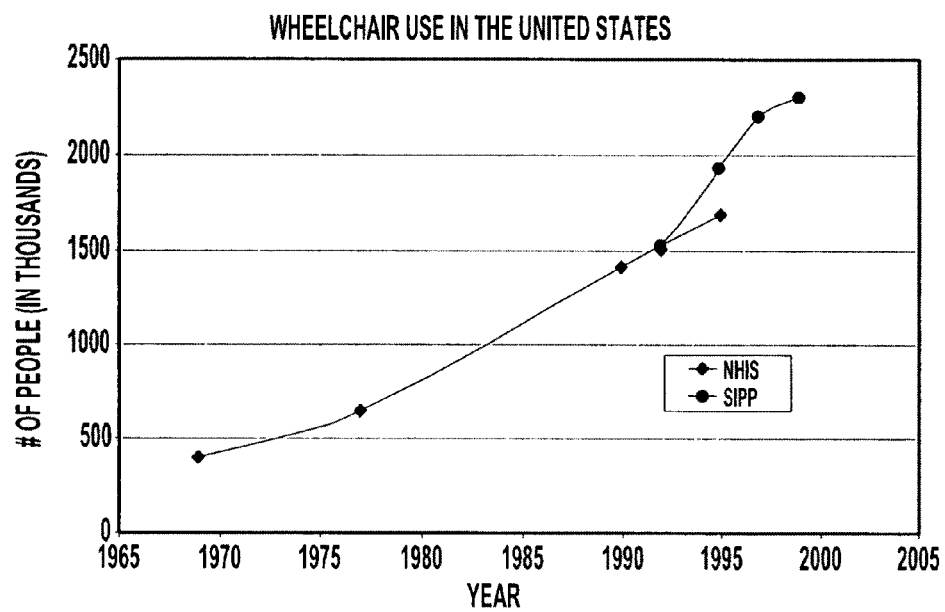
FIG. 1 shows a graph of wheelchair users in the United States verses time.
Figure 2:
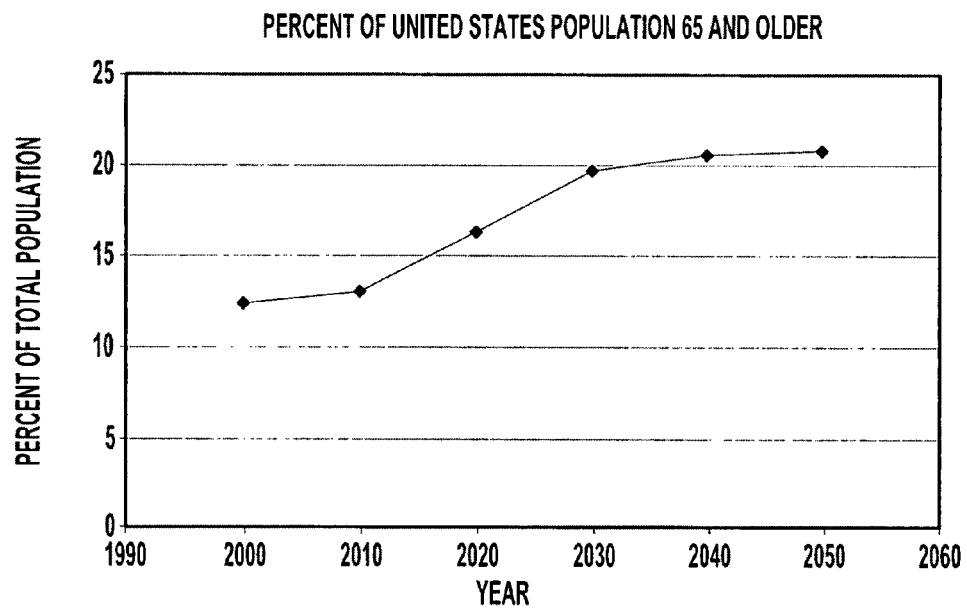
FIG. 2 displays a graph projecting the increasing amount of persons aged 65 and over in the United States verses time.
Figure 3A:
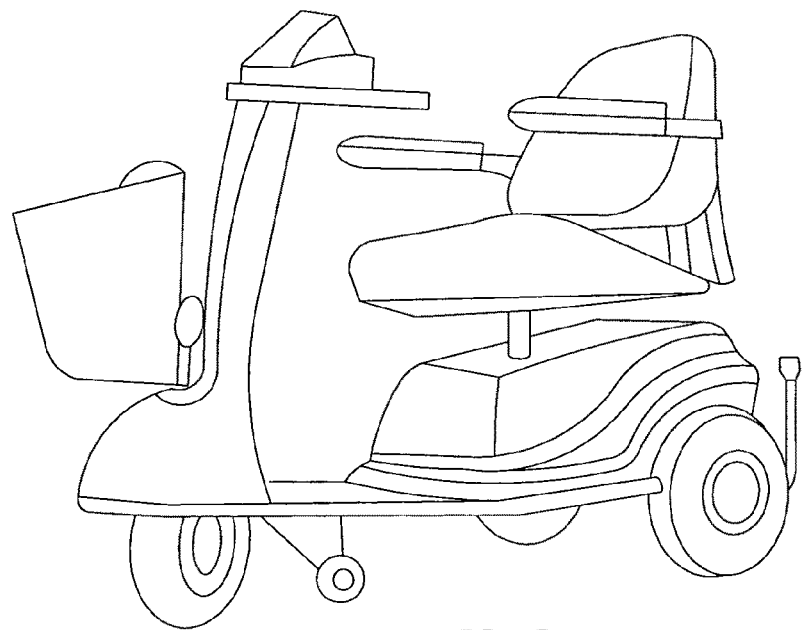
FIG. 3A illustrates an example of a POV.
Figure 3B:
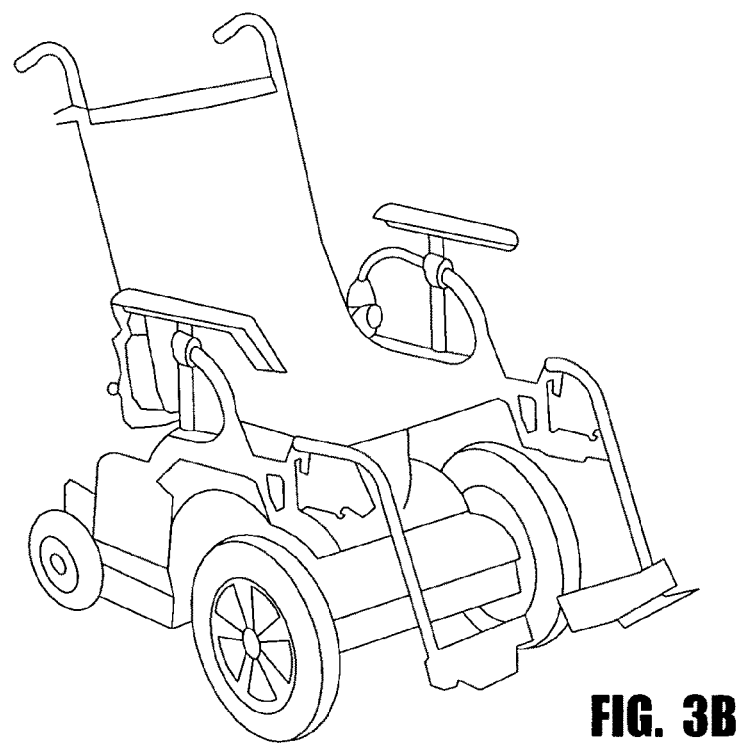
FIG. 3B illustrates an example of an EPW.
Figure 4A:
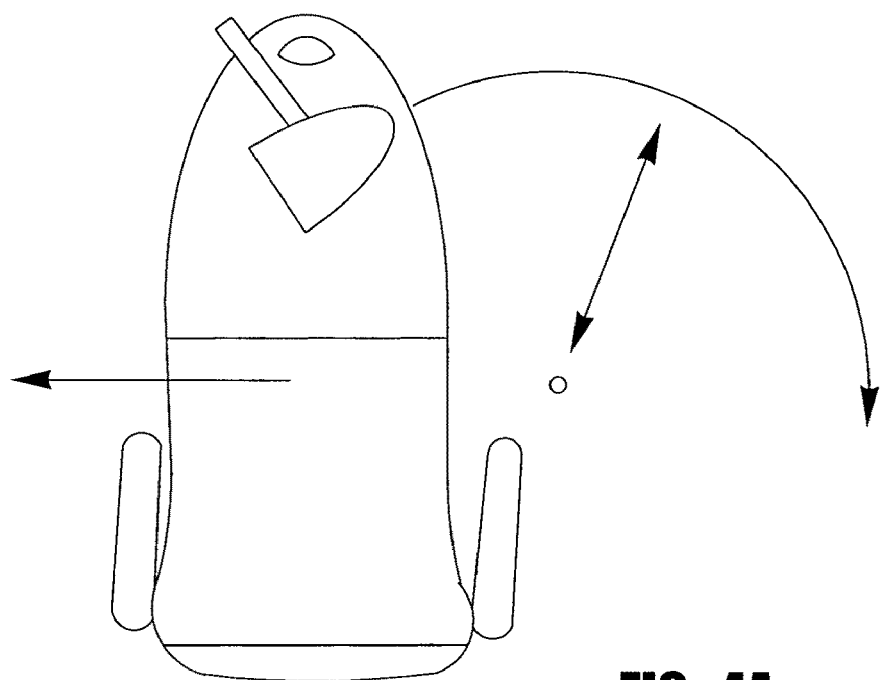
FIG. 4A displays the turning capabilities of a typical POV versus that for a typical EPW in FIG. 4B.
Figure 4B:
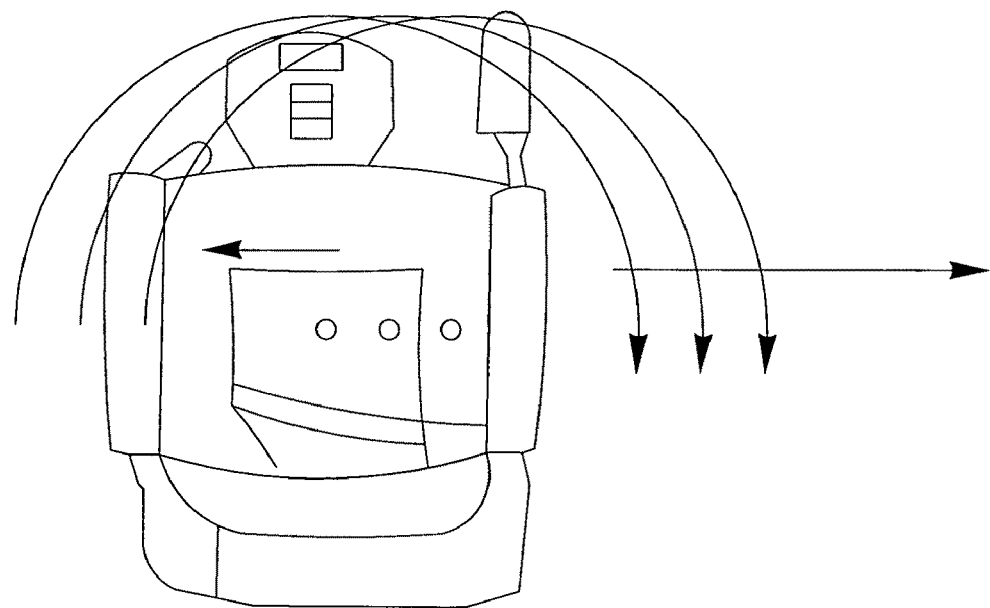
FIG. 4B displays the turning capabilities of a typical EPW.
Figure 5A:
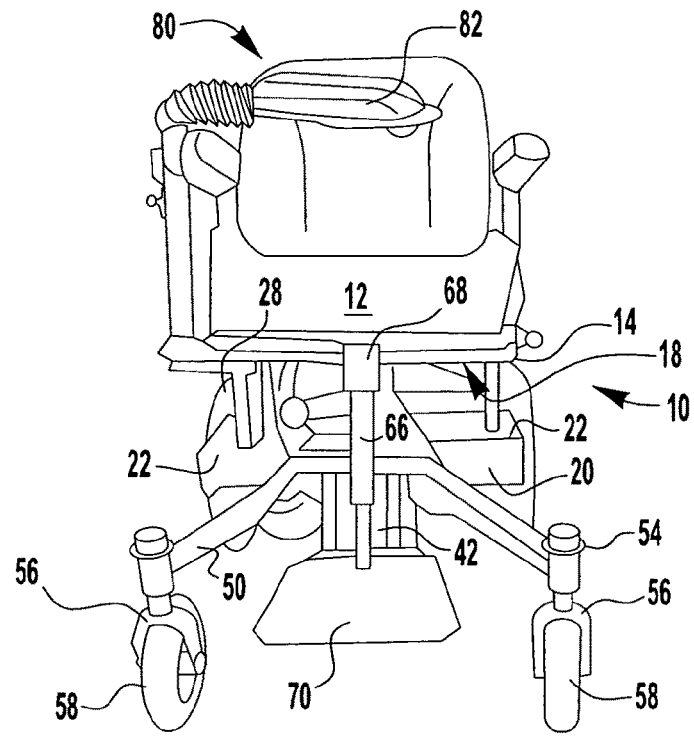
FIG. 5A shows a front view of the HyPoV of the present invention.
Figure 5B:
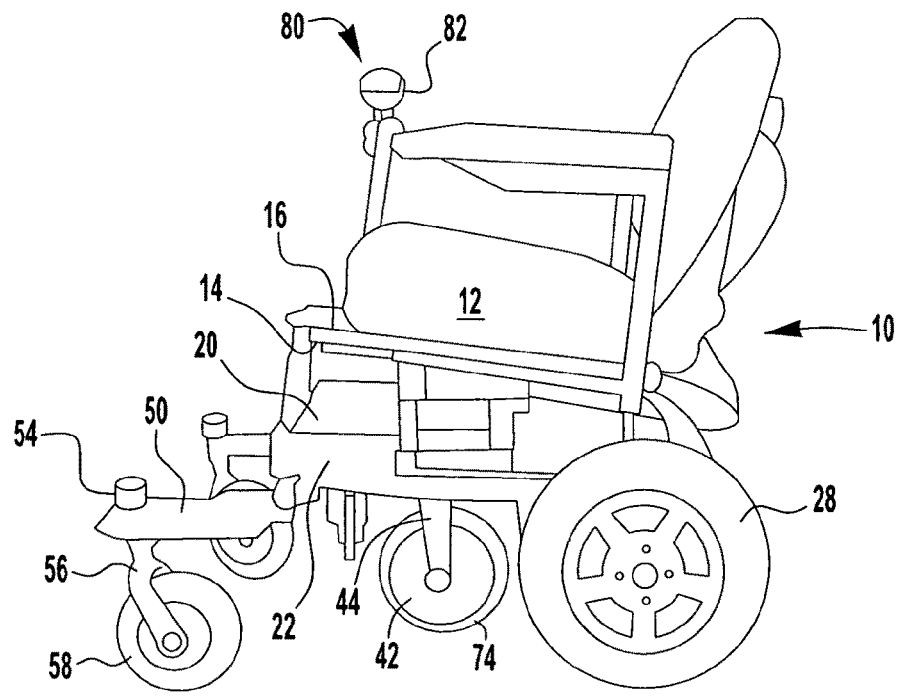
FIG. 5B shows a left side view of the HyPoV from FIG. 5A.
Figure 5C:
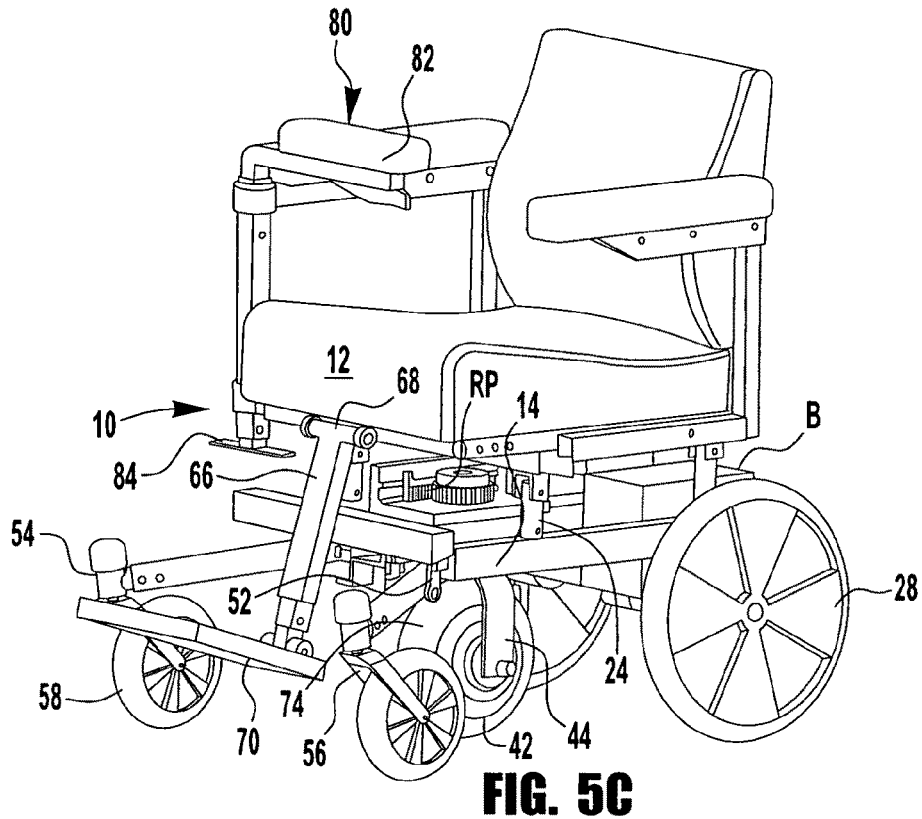
FIG. 5C shows a perspective view of the aforementioned HyPoV as seen from the left front corner of same.
Figure 5D:
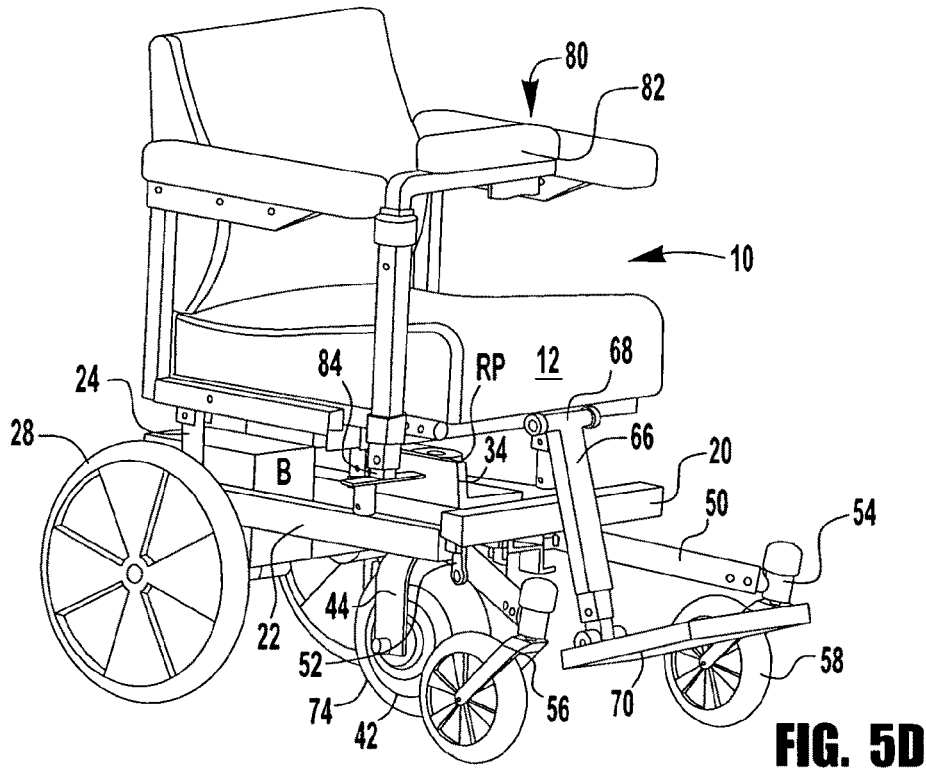
FIG. 5D shows a perspective view of the HyPoV from FIG. 5C from the opposite, right front corner.
Figure 6:
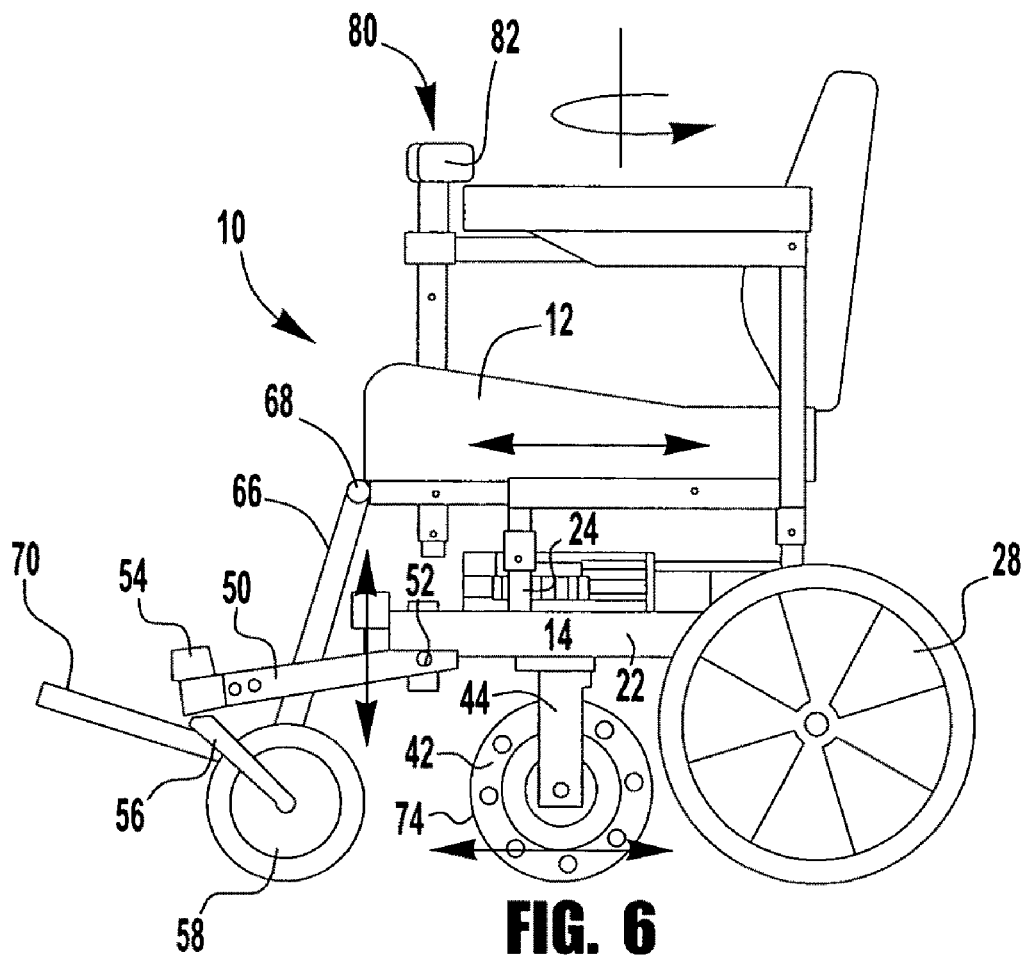
FIG. 6 illustrates various directional movements with one embodiment of HyPoV according to the present invention.

The invention will now be described in detail in relation to several preferred embodiments and the implementations thereof which are exemplary in nature and descriptively specific as disclosed. As is customary, it will be understood that no limitation of the scope of the invention is thereby intended. The invention encompasses such alterations and further modifications in the illustrated apparatuses and methods, and such further applications of the principles of the invention illustrated herein, as would normally occur to persons skilled in the art to which the invention relates.

And now referring generally to FIGS. 5A through 5D, a first preferred embodiment of HyPoV 10 is disclosed in more detail. Particularly, this embodiment teaches an EPW seat 12, or similar model, mounted on a substantially rectangular frame 14. That frame 14 has a top 16 and bottom 18 and is preferably made from metal or another similar rigid material. The frame 14 preferably includes one front rail 20 and two side rails 22 (as better seen in FIGS. 10 through 12). It should be noted that the frame can optionally be made from a single piece of rigid material thereby reducing weight and increasing stiffness.

The seat 12 is attached to the top 16 of frame 14. More specifically, seat 12 attaches to the two side rails 22 of frame 14 via multiple sliding seat perches 24; at least one seat perch 24 on each frame side rail 22 (as better seen in accompanying FIG. 7B). The seat 12 is optionally adjustable along the side frame rail 22 to comfortably fit a particular user. Also, the seat 12 can be mounted to face in either direction to be adaptable for various wheelchair user needs. The seat-frame can also be custom built for the HyPoV thereby reducing overall weight and reducing costs.

Figure 11:
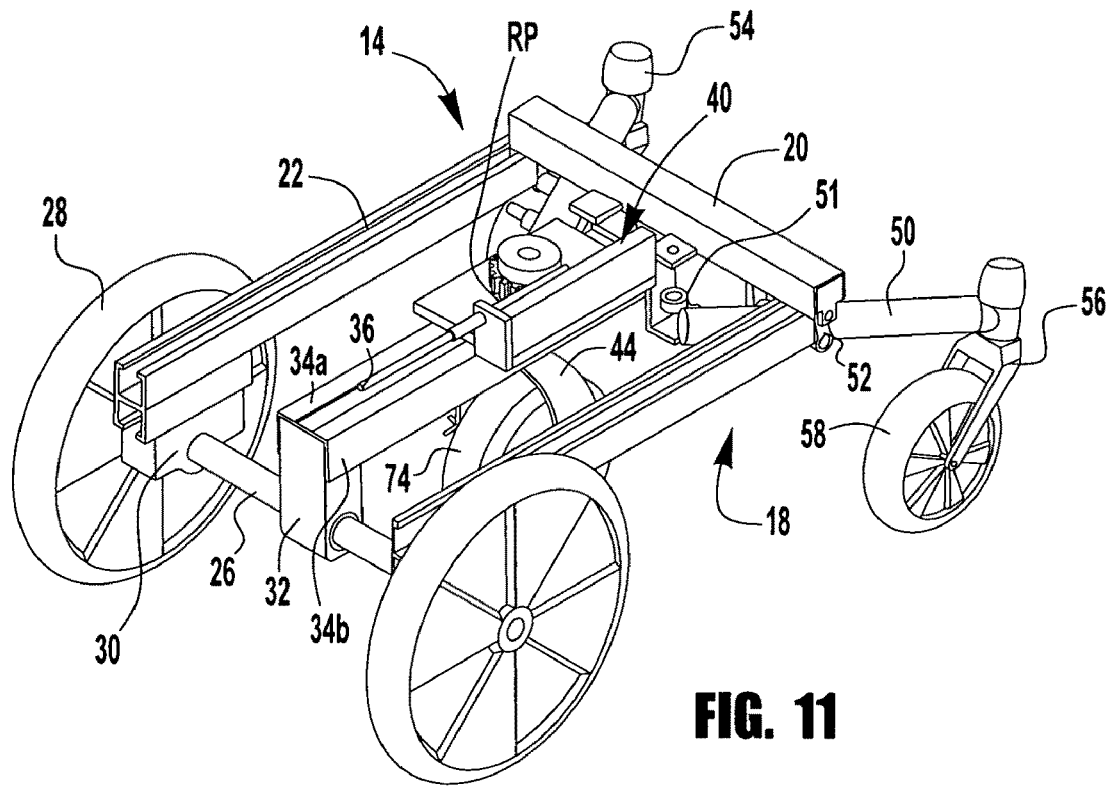
FIG. 11 is a perspective view of the HyPoV from FIG. 10 with the seat and both batteries removed.
Figure 12:
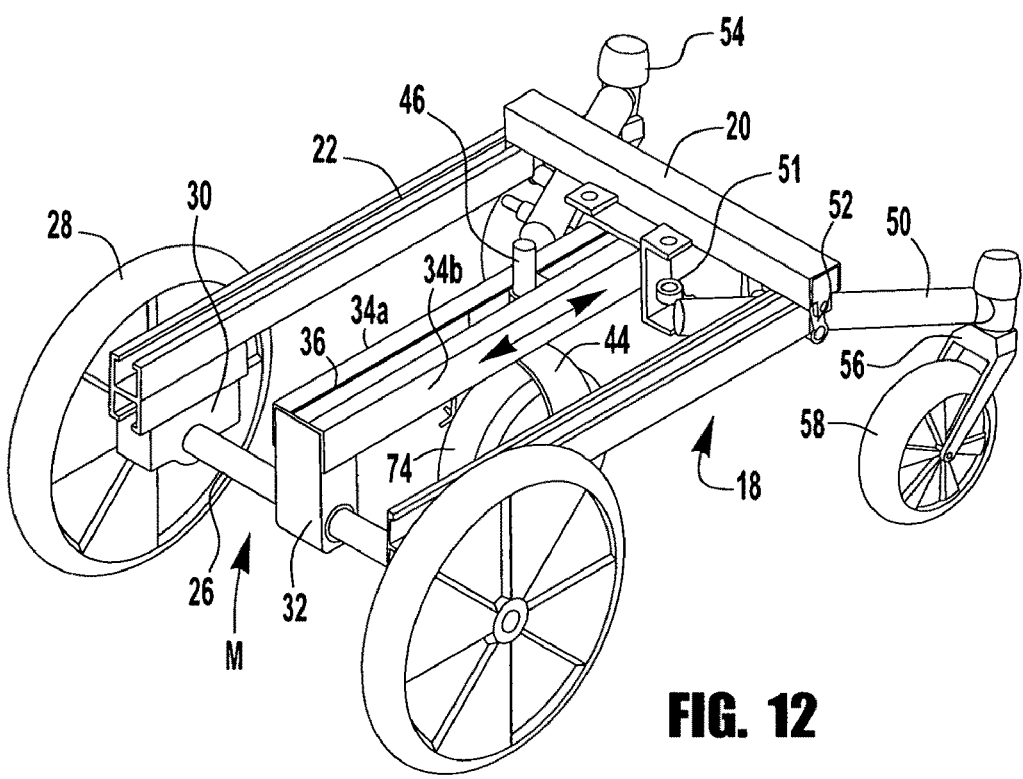
FIG. 12 is a perspective view of the HyPoV from FIG. 11 with additional components removed to illustrate the drive motor connection within an optional slot in the center swing-arm.

In this embodiment of HyPoV, a solid axle 26 joins two large freely spinning wheels 28 via wheel axle brackets 30 (better seen in FIGS. 11 and 12). The brackets 30 and axle 26 solidly connect the two side frame rails 22 to each other. The solid axle brackets 30 can optionally be integrated into a one-piece frame embodiment, thereby lowering the weight of the HyPoV and increasing the frame's stiffness.

A pivot connection piece 32 is attached near the midpoint M of the rear solid axle 26 and pivots about the axle between the large wheels 28. An elongated center swing arm 34 is then rigidly attached to the pivot connection piece 32 at one end, and to a midpoint of the front rail 20 on the other end. This swing-arm system houses the motor/brake/turning system, generally 40 in FIG. 10. The pivot connection piece 32 enables the center swing arm 34 to pivot about the rear solid axle 26 and to move parallel to the longitudinal axis of the side frame rails 22 according to the load balance on the caster wheels and drive wheel described later herein.

Figure 10:
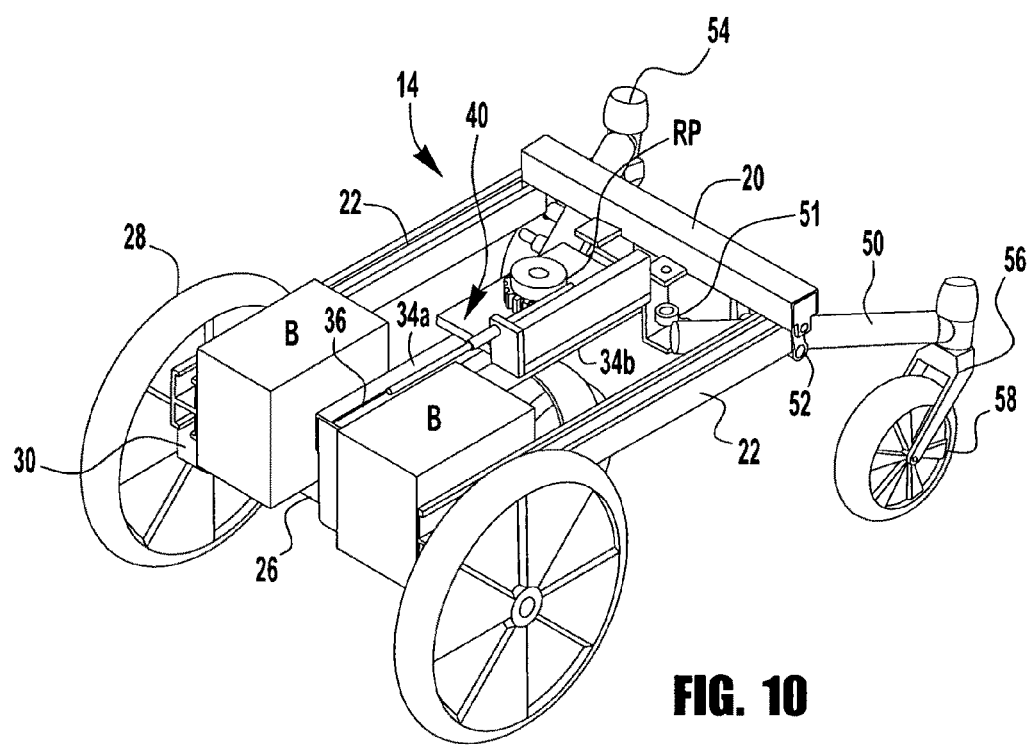
FIG. 10 is a perspective view of the HyPoV of the present invention with the seat removed to detail the frame, center swing-arm, battery location, and one embodiment of steering mechanism and suspension system.

Referring now to FIGS. 10 through 12, the center swing arm 34 can be built from two parallel pieces of angle iron 34a and 34b thereby defining a slot 36 in the longitudinal axis of said center swing arm. The center swing arm 34 can optionally be fabricated from a single rigid piece of metal or the like in which a single channel is defined. In another embodiment (not shown), the center swing arm 34 could be made solid and not have a defined slot 36 therein. By using a single piece instead of two parallel pieces of angle iron, the stiffness of the center swing arm 34 could be increased thereby reducing the need for incorporating heavy stiffening elements into the vehicle.

The center swing-arm 34 can be shortened and the spring perches formed with a short segment of I-beam (not shown) attached to an end of the swing-arm 34. Using this I-beam segment, the forces transferred between the swing-arm and suspension links are located close to the centerline of the swing-arm, which reduces the amount of lever-arm forces about the swing arm. With a smaller lever-arm, the torques about the longitudinal-axis of the swing-arm would also be reduced, effectively stiffening the drive-train of the device, making it more responsive and maneuverable.

Referring now to FIGS. 7A, 7B and 10 through 12, a drive wheel 42, which is preferably a hub-motor, is placed in a fork 44 with a bearing (not shown) mounted near its topmost portion. Extending upwardly from the top of the bearing is a shaft 46. As shown for one embodiment, the shaft 46 extends optionally through the slot 36 defined in the center swing arm 34 and connects to a steering mechanism 80 described later herein. The drive wheel 42, fork 44, bearing and shaft 46 all connect to the center swing arm 34 so that they can be adjusted within the slot 36 formed by the two pieces of angle iron, or in the alternative slot and channel formed in the single piece, center swing arm (not shown). The direction of adjustment is indicated by the arrow on angle iron 34b in FIG. 12. This adjustment of the drive wheel position permits the force on it to be increased or decreased as the force on the casters increases or decreases.

The alternative slot and channel can be provided so that the maneuverability of the HyPoV can be adjusted or tuned. The drive wheel 42 can optionally be linked to an actuator in the slot and channel to move it forward and back within the slot. This feature allows, for example, an indoor mode (with a very tight turning radius but less stable at high speeds) and an outdoor mode (with a less tight turning radius, but stable at high speeds).

In the first embodiment, at FIGS. 7B and 10 through 12, two suspension links 50 are connected by means of a bracket 51 to the center swing arm 34. These suspension links 50 extend towards the intersections of the front frame rail 20 and the two side rails 22. Optionally, the suspension links 50 may extend outwardly in a direction parallel to the side frame rails 22. In another embodiment, the suspension links 50 extend outwardly in a direction perpendicular to the side frame rails 22.

At this intersection, two shackles 52 are provided which support each suspension link 50. Each suspension link 50 continues to extend past each shackle 52 to a rotatable joint 54. Needle bearings or bushings are usually used in the rotating points on the suspension links 50 and center swing-arm 34, although similar bearings or bushings are also within the scope of the invention.

In FIGS. 5A through 12, a caster wheel fork 56 is attached to and extends downwardly from an outward end of each rotatable joint 54. The two casters wheels 58 are smaller than the two large wheels 28 and are capable of rotating 360 degrees by means of the rotatable joint 54. The caster wheels 58 are located on one end of the HyPoV 10 opposite the large wheels 28. The large wheels 28 can be located in the front of the HyPoV 10 and the caster wheels 58 can be located in the rear (see FIGS. 8 and 9) or vice versa, depending on the user's preference. Both embodiments of large and caster wheel configurations are addressed herein.

Figure 7A:
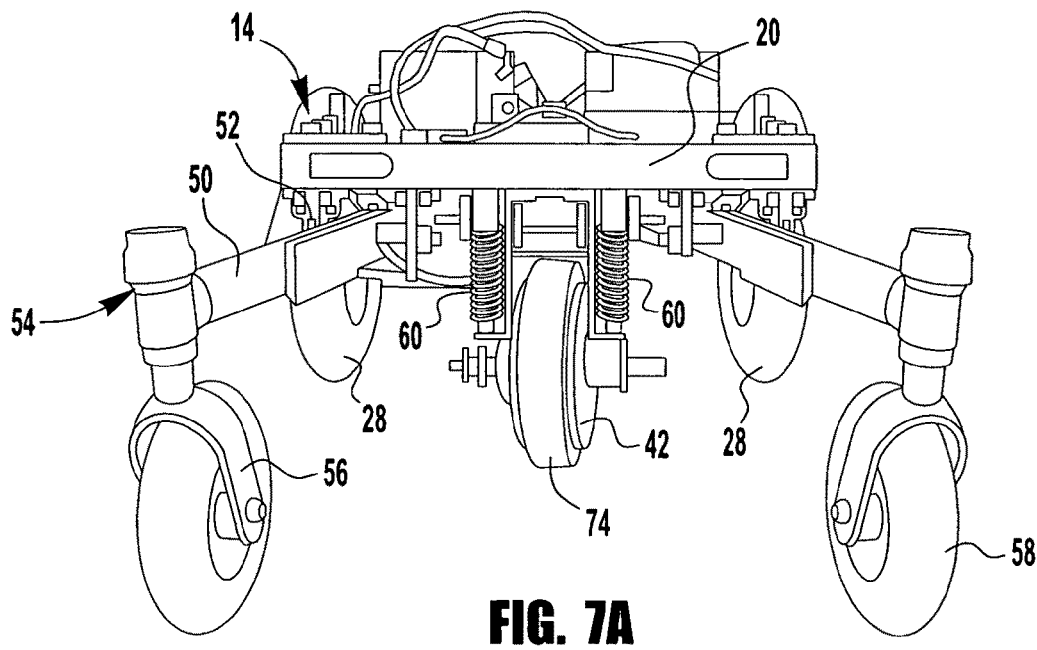
FIG. 7A illustrates a front view of the lower wheelbase for the HyPoV of FIGS. 5A and B.

The caster wheels 58 each have an independent suspension system comprised of springs 60 (as best seen in accompanying FIG. 7A). The springs 60 allow vertical displacement of the caster wheel 58 and transfer the force to the drive wheel 42 as the caster wheel 58 encounters obstacles, bumps, uphill or downhill surfaces or any other kind of terrain. On a flat surface, the downward force on the drive wheel 42 is approximately three times more than the downward force on a single caster wheel 58. In that each caster wheel 58 has an independent suspension system; it is possible that a nominal force is applied on only one caster wheel 58, while the other caster wheel is experiencing a force equal to that asserted on a flat surface. The prior art does not teach or suggest a wheelchair as shown in the present invention that has an independent front suspension capable of transferring downward force from a caster wheel 58 to a centrally located, drive wheel 42.

Figure 13:
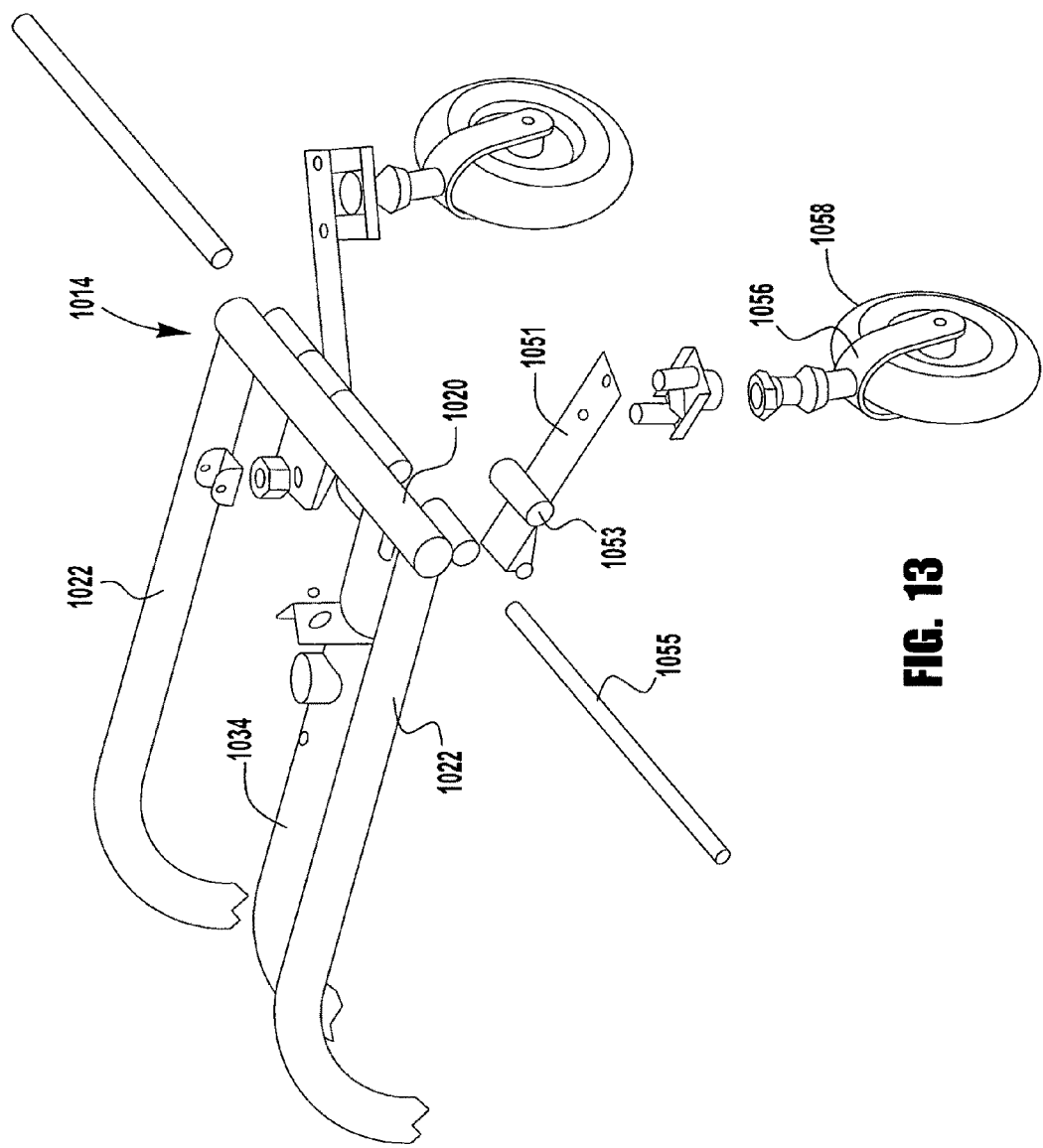
FIG. 13 is a perspective view of an alternate embodiment of HyPoV lower frame showing a leaf-spring based suspension system.

A first alternate suspension system is shown in accompanying FIG. 13. In all alternative embodiments, common components are commonly numbered in the next hundred or thousand series. As such, this first alternate frame 1014 still has a front rail 1020 and two side rails 1022. Two large, non-drive wheels (not shown) are situated at the front or rear of this alternate HyPoV. Caster wheels 1058 rotatably mount within caster wheel forks 1056 toward the front of the frame 1014. A main drive wheel (also not shown) would extend downwardly from a center swing arm 1034. Instead of suspension links per se for each caster wheel, this first alternate system employs a leaf spring 1051, each leaf spring having an eyelet 1053 through which a cross bushing 1055 is inserted for greater cross stability.

Figure 14:
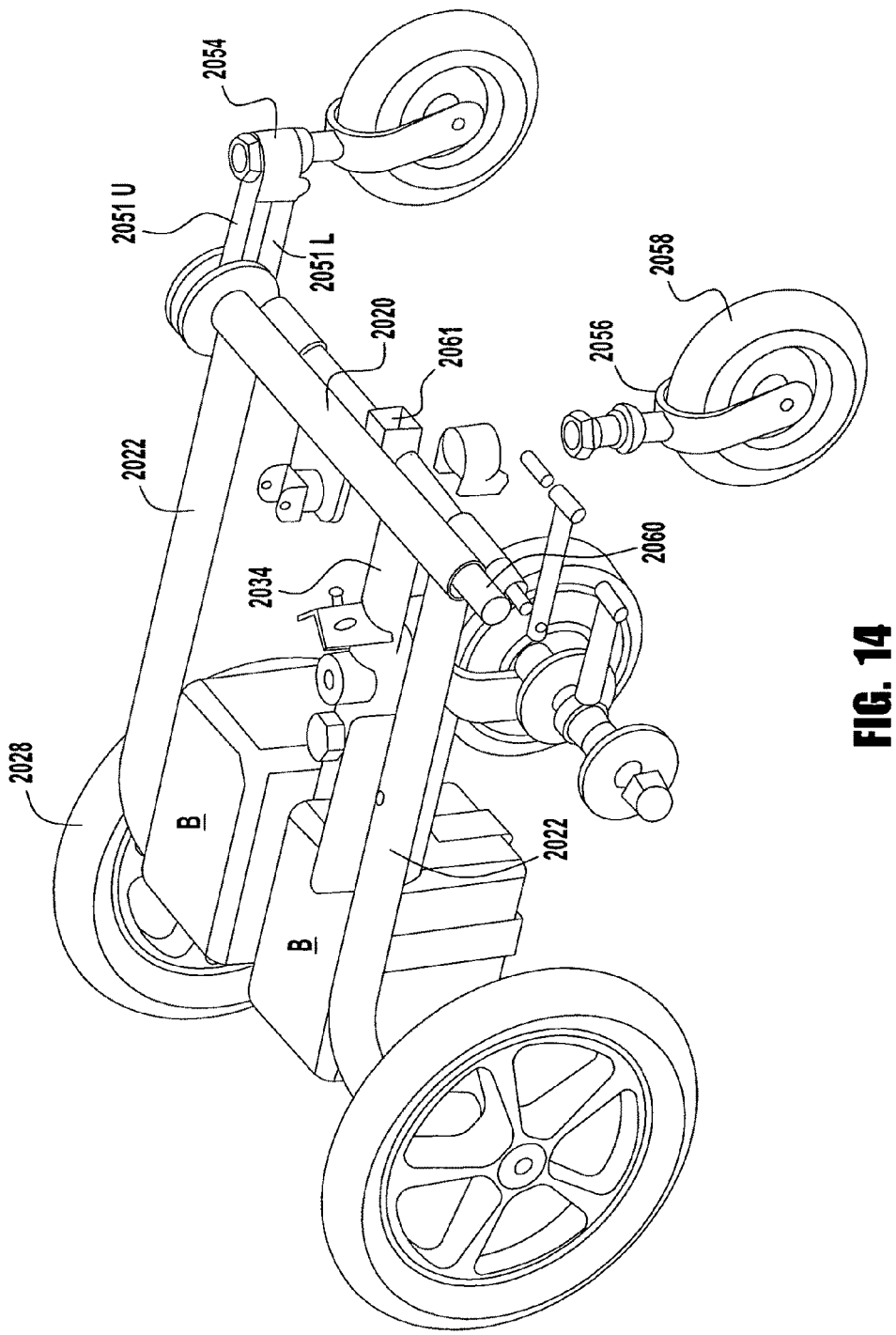
FIG. 14 is a perspective view of an alternate embodiment of the HyPoV lower frame showing a torsion-spring based suspension system.
Figure 15:
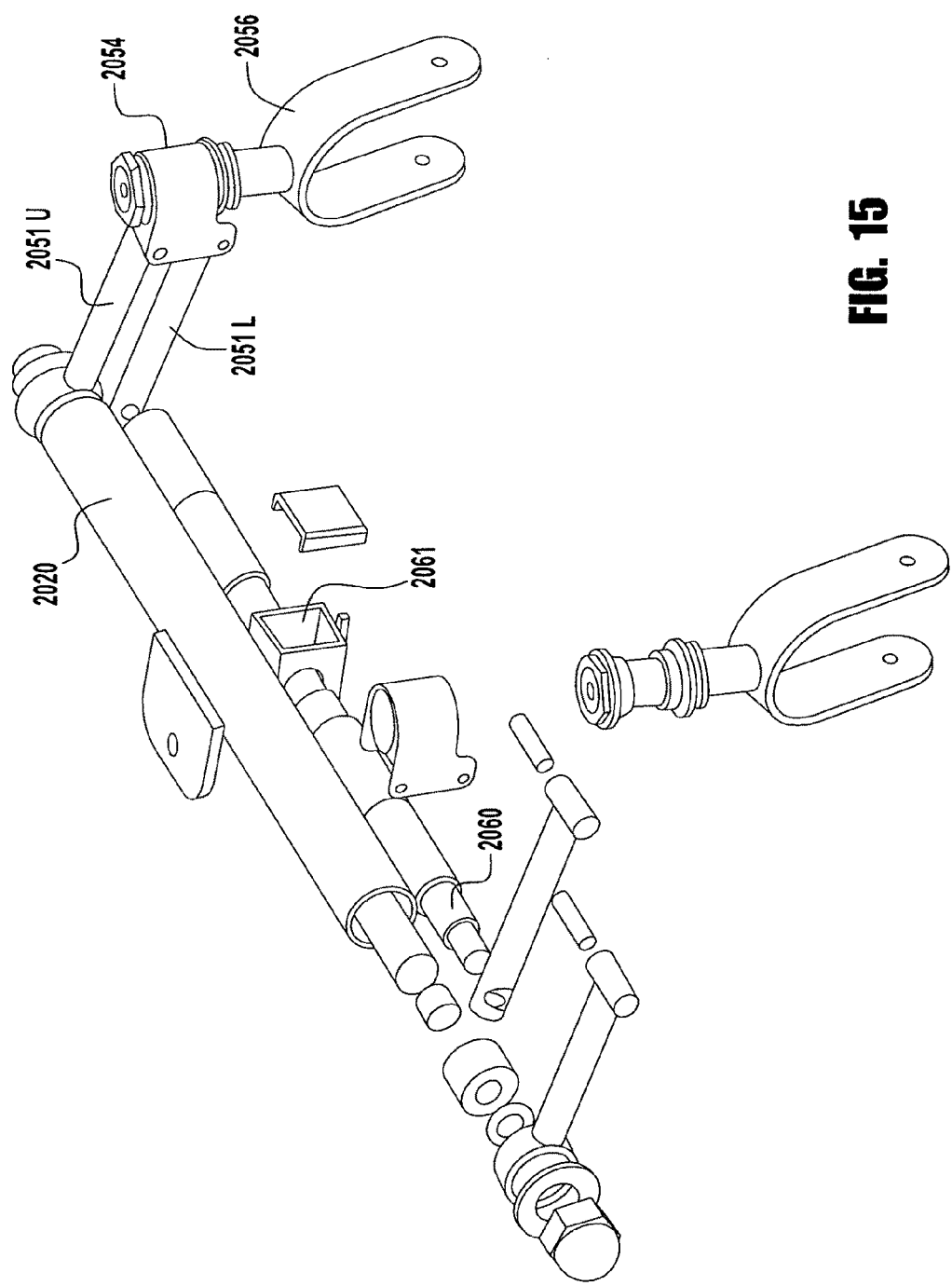
FIG. 15 is an exploded, perspective view of several frame and suspension components from FIG. 14.

A second alternate suspension system, best seen in FIGS. 14 and 15, addresses potential tipping instabilities. In some tests, steep uphill driving (especially on a side slope) or during sharp turning at higher velocities, HyPoV tipping instabilities were noted. In this embodiment, each caster wheel fork 2056 connected to center swing arm 2034 with separate upper 2051U and lower 2051L link arm bars. The upper link bars 2051U connect and pivot about an axle located inside 2020. The lower link bars 2051L are fixed to a polymer or metallic torsion spring 2060 which links to the center swing-arm 2034 through an adjustable bracket 2061.

Referring again to FIGS. 5A through 6, 8 and 9, the present invention further comprises a bar 66 extending outwardly and downwardly from the front lower portion of the seat 12. The bar 66 can be attached to the seat 12 by any means known in the art including the pivotable connection 68 shown. At the end of the bar 66, furthest from the seat 12, a foot platform 70 is attached thereto and extends outwardly therefrom in a direction away from the frame 14 of the vehicle 10. The foot platform 70 provides users a place for their feet to be placed during use of the vehicle. In another embodiment, one or more foot platforms 70 can be attached to the front frame rail 20. The HyPoV 10 of the present invention can also utilize any foot platform technology known to those skilled in the art.

As best seen in FIGS. 7A through 9, a key feature of the "HyPoV" of this invention is its centrally-located, drive wheel 42. That central drive wheel 42 usually includes a hub-motor, a fork 44, a bearing and shaft 46, along with two springs 60 and steering mechanism 80. Each spring 60 independently provides suspension and force transfer to a suspension link 50 and caster wheel 58, thereby enabling the caster wheel 58 to travel over rough terrain or obstacles. The hub-motor (not shown) is fully enclosed within the drive wheel's hub and has a tire 74 surrounding the hub. The tire 74 can be a hard rubber tire or a tire with a pneumatic or solid-insert to increase traction and obstacle climbing ability. The tire 74 can also optionally be any other material known to those skilled in the art. An electromagnetic brake can be found internal to the drive wheel 42. Cumulatively, this system allows for a compact drive, suitable braking and steering attached to a simple, yet quite effective suspension system.

A centrally located, drive wheel 42 generally allows the HyPoV 10 to turn in very tight spaces, within its own footprint. It also increases traction, since the drive wheel 42 is within the center of the device 10, where the weight of the user, frame 14 and seat 12 are focused. The drive wheel 42 turns when directed by the user.

Referring again to FIGS. 7A, 7B and 10 through 12, the independent suspension links 50 which span from the rotatable joint to the center swing-arm 34, where the drive wheel 42 is secured, amplify the downward force on the drive wheel 42 and further increase traction. These independent suspension links 50 are mechanically connected to the steering and drive systems to provide increased maneuverability on rough terrain or when the HyPoV 10 encounters obstacles.

In weight distribution tests on the HyPoV, the downward force on the drive motor was three times the force on the caster wheels 58, and 1.5 times the force on the large wheels 28 when the HyPoV 10 was sitting idle, on a flat surface. When any of the four surrounding wheels 28 or 58 travel over an obstacle, the suspension mechanism shifts weight directly to the drive wheel 42 maintaining and, in many scenarios, increasing the downward force on the drive wheel 42. This feature allows the HyPoV 10 to travel over a variety of surfaces and terrains.

The steering mechanism, generally 80, of FIGS. 5A through 6, 8 and 9, actuates HyPoV turning. Such steering can be operated manually, as a power-system or in some combination as with a power-assist. Because device steering operates by a cable-driven mechanism in one embodiment, the steering mechanism 80 is adjustable to essentially any location on the device. The steering mechanism 80 can be secured to the right or left side of the vehicle's seat, though a right side mounting is shown for illustrative purposes in FIGS. 5A through 6, 8 and 9. Such adaptability allows a user who can functionally better from one side of the device to adapt the HyPoV to his or her specific needs.

The HyPoV design of this invention also allows for the steering mechanism 80 to be moved in all degrees of freedom, including laterally, vertically, and fore and aft, with respect to the user. The steering mechanism 80 can be flipped up, out of the way of the user so he or she can have an unobstructed reach when not driving and can easily transfer out of the HyPoV 10.

Figure 7B:
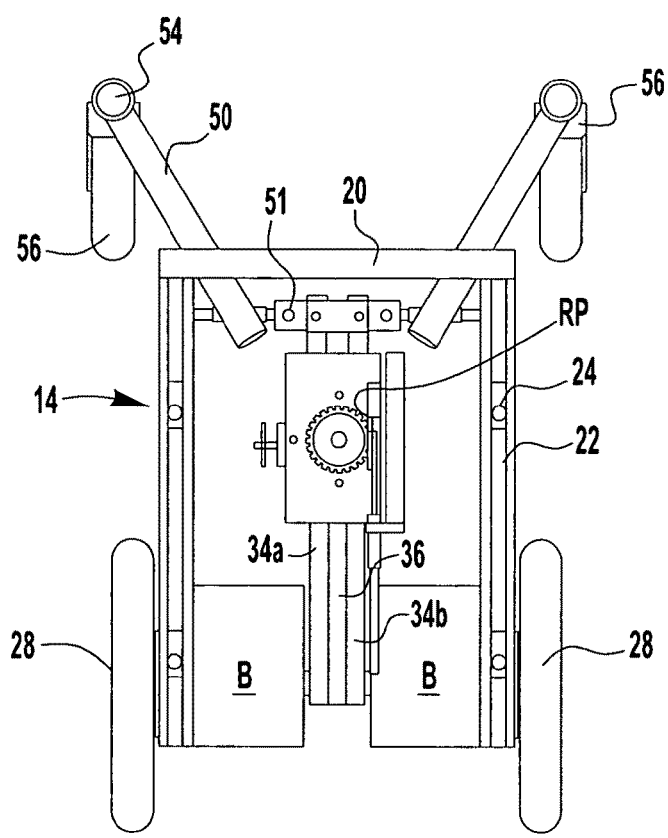
FIG. 7B illustrates a top view of FIG. 7A.
Figure 8:
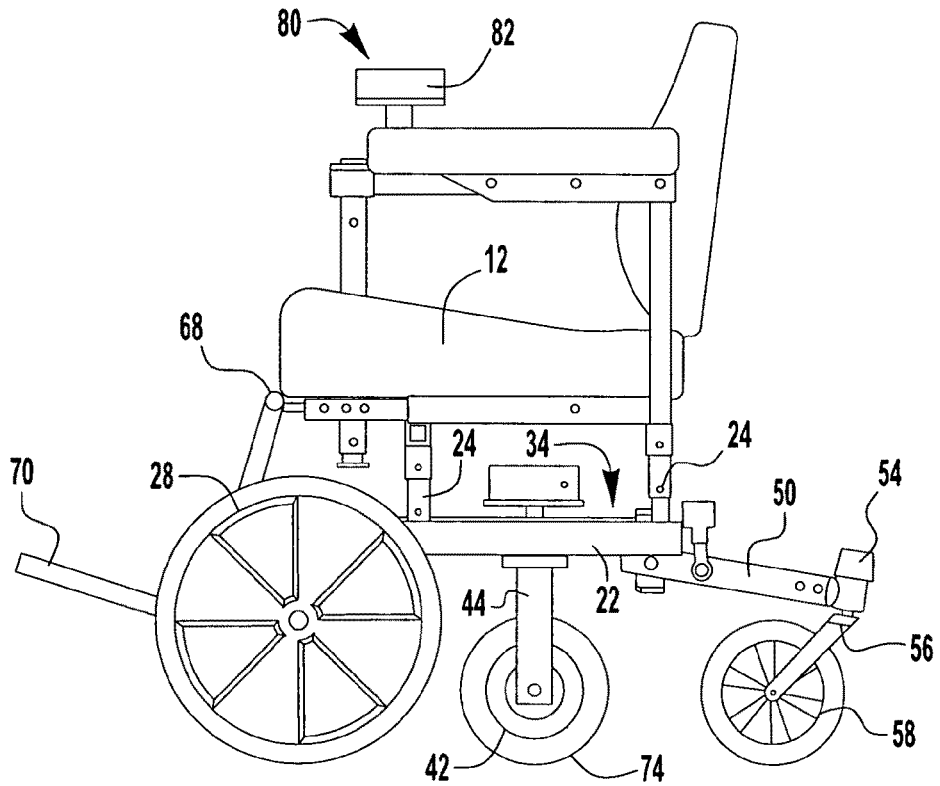
FIG. 8 shows a left side view of a second embodiment of HyPoV according to this invention, this embodiment having the casters located near the rear and the large wheels located in the front.
Figure 9:
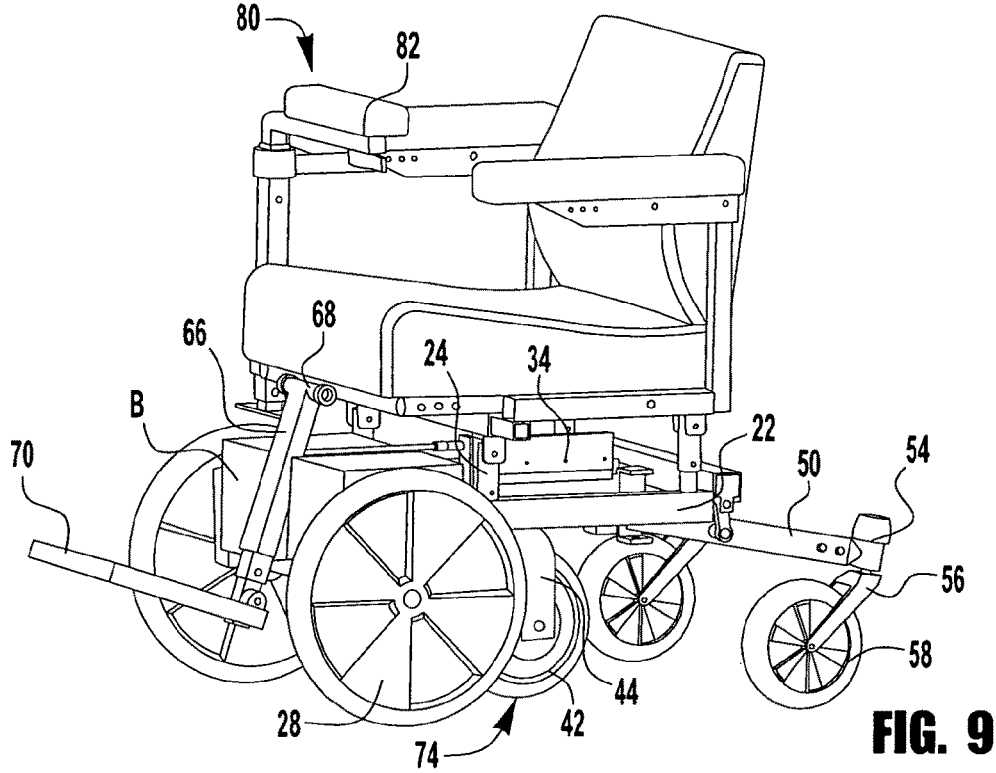
FIG. 9 shows a perspective view of the HyPoV from FIG. 8 as seen from the left front corner of same.

Per FIGS. 7B, 10 and 11, a first embodiment of steering mechanism 80 uses a push-pull cable (not shown) to operate a rack-and-pinion type assembly (element RP therein). This rack-and-pinion system RP can be actuated by a tiller 82 (also seen in FIGS. 5A through 6, 8 and 9). When the user pushes and pulls the tiller 82, the following cascade of events occurs: (1) a lever 84 (best seen in FIGS. 5C, 5D, 8 and 9) connected to a lower end of tiller 82 pushes and pulls a single cable (not shown) rated for both tension and compression; (2) the second end of that cable pushes and pulls on a linear gear ('rack'); which (3) rotates a meshed pinion gear (the rack and pinion being combined herein as RP) attached to the fork 44 of the drive-motor; thus (4) turning the motor within drive wheel 42.

To reduce cost and stiffness, the above-described rack-and-pinion mechanism can be replaced with a simpler device that uses rotary motion instead of translating rotary motion to linear motion and back. For increased adjustability, the optional steering device may have different gear ratios between the input force from the user and the output force on the drive wheel. Most importantly, the optional steering device will allow users to employ a pushing or pulling motion for steering instead of pushing to turn in one direction and pulling to turn in the opposite direction. Users with weaker torso strength may not be able to maintain their balance when they pull on a steering tiller. Allowing users to choose the type of motion for steering, and to supplement one motion with the other, creates flexibility and support for users with various abilities. Lastly, the optional steering system should not impede a user transferring into and out of the HyPoV.

One such optional steering mechanism is the drum-cable system shown in FIGS. 18 through 24B. It allows for variable gear ratios and varies the force necessary for steering the HyPoV 210. Most parts of this optional steering system can be modified to use relatively inexpensive and widely-available materials, with known manufacturing processes.

Figure 24A:
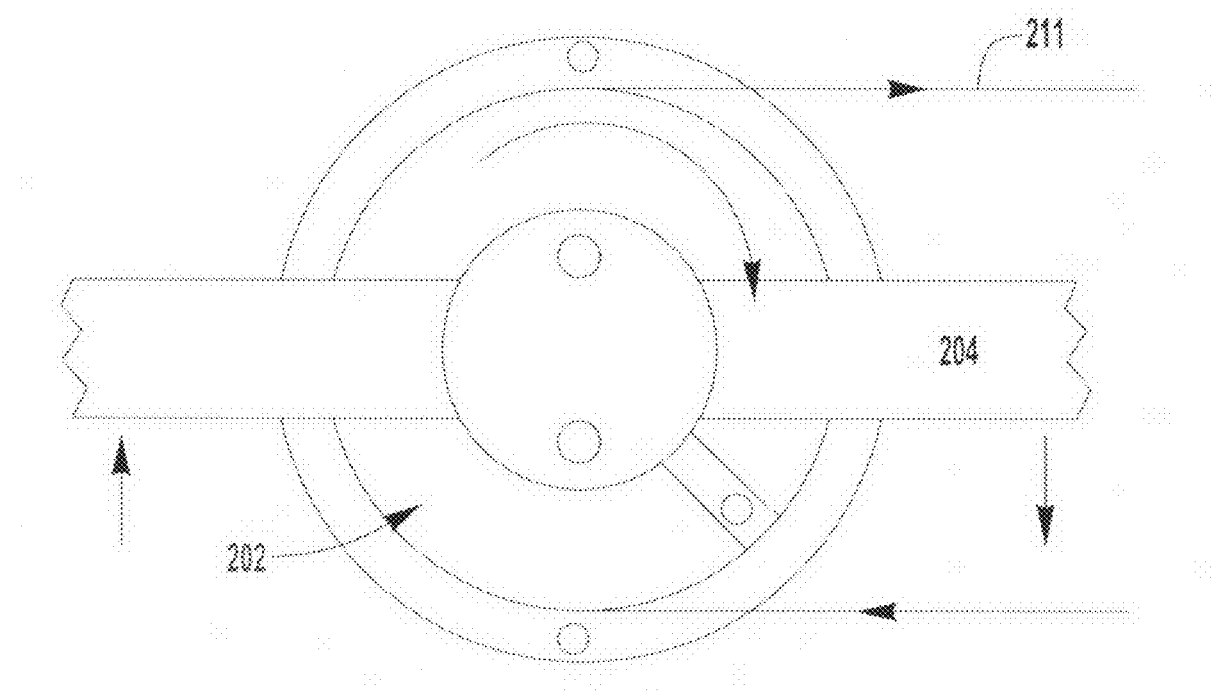
FIG. 24A is a top view of an upper steering drum schematically showing the pushing and pulling motions and directions of cable movement and tension for a user making a right-hand turn therewith.
Figure 24B:
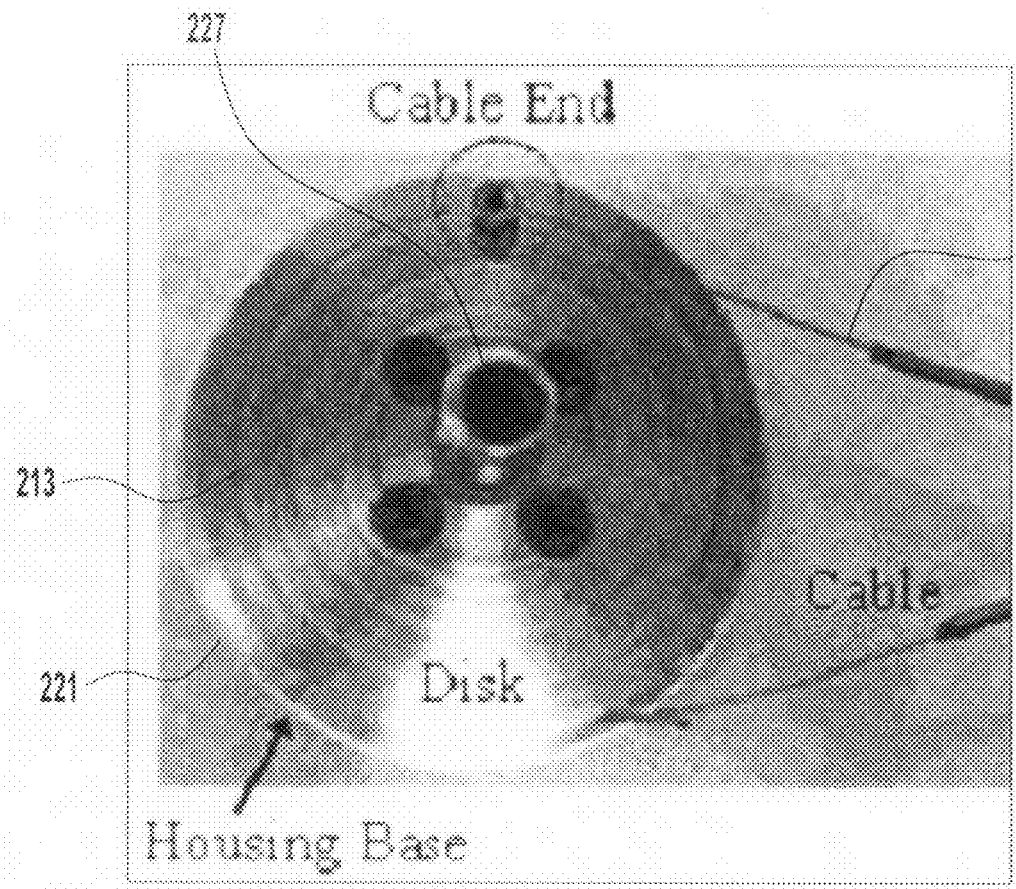
FIG. 24B is a photograph showing a lower driven drum and cable end connection from FIG. 24A.

Referring to FIGS. 24A and B, a dual-cable type, manual steering system, generally 200, is similar to the steering system for a sailboat. In this HyPoV steering alternative, a user can turn a tiller handle, or handlebars 204, attached to a drum 202 (or 'yoke') around which both cables 211 [rated only for tension) are wrapped in opposite directions. The other ends of each cable 211 wrap around a similar drum 206 (or 'yoke') attached to the drive-motor fork 244. Thus, when a user turns the tiller/handlebar 204 one way, one of the cables 211 is in tension and turns the drive motor. Turning the tiller/handlebar 204 in the opposite direction induces the opposite behavior on the drive motor.

Figure 19:
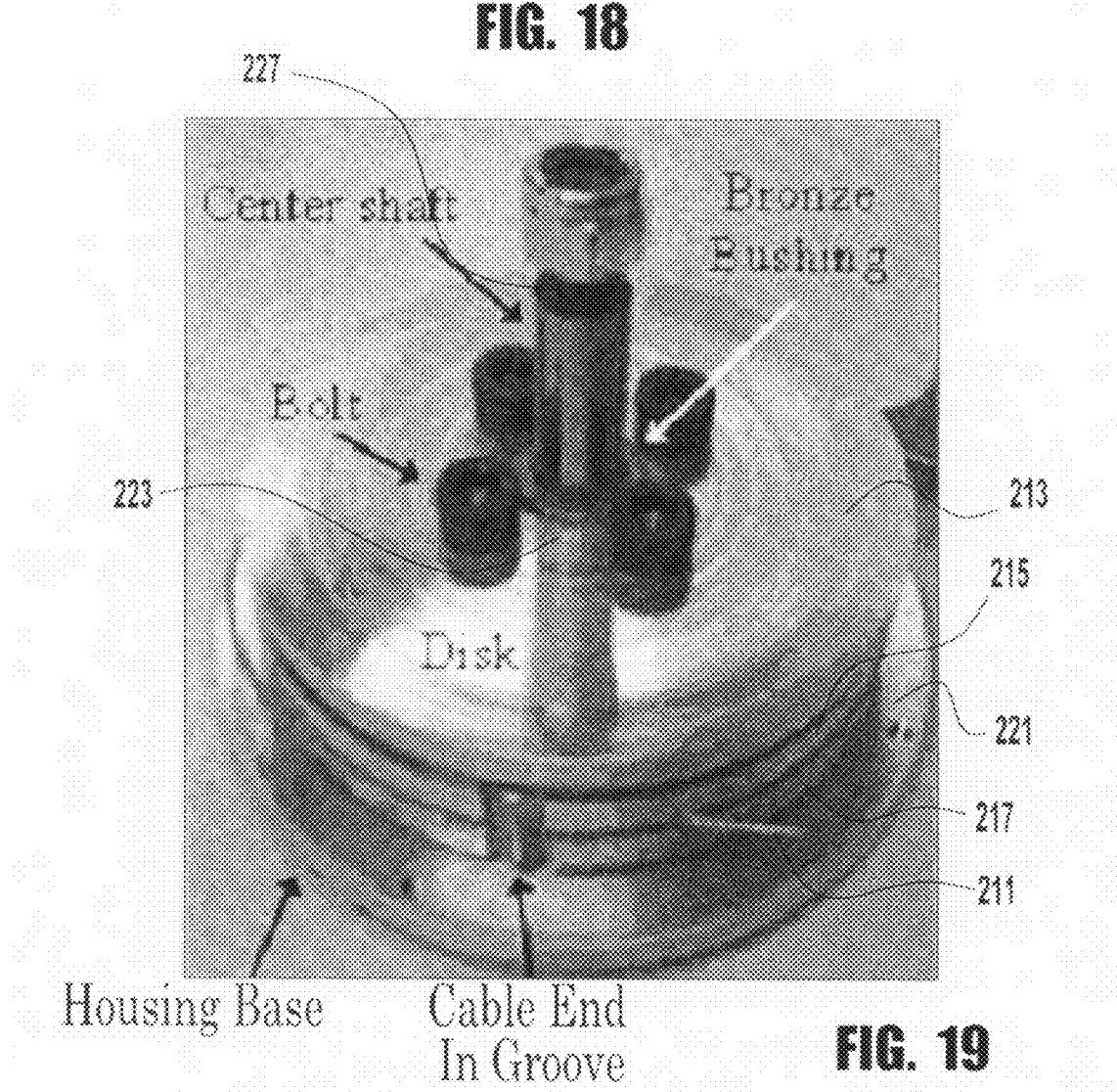
FIG. 19 is a photograph showing the upper steering drum from FIG. 18.
Figure 20:
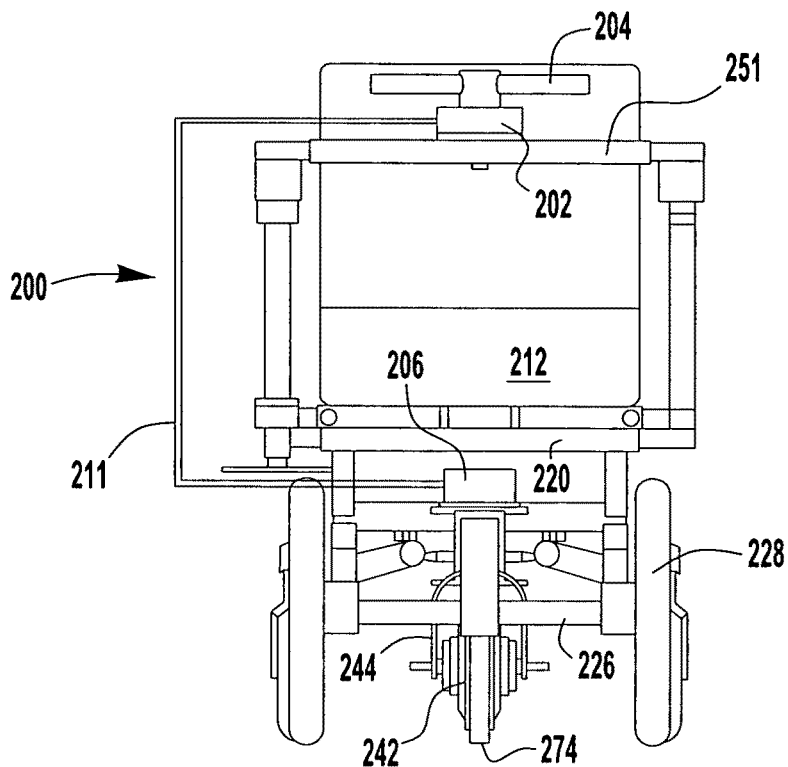
FIG. 20 shows a front view of an alternate embodiment of HyPoV having an optional steering mechanism with a nylon-capped, steering drum housing, the tiller (steering handle) for that mechanism being shown when placed in a center position.
Figure 21:
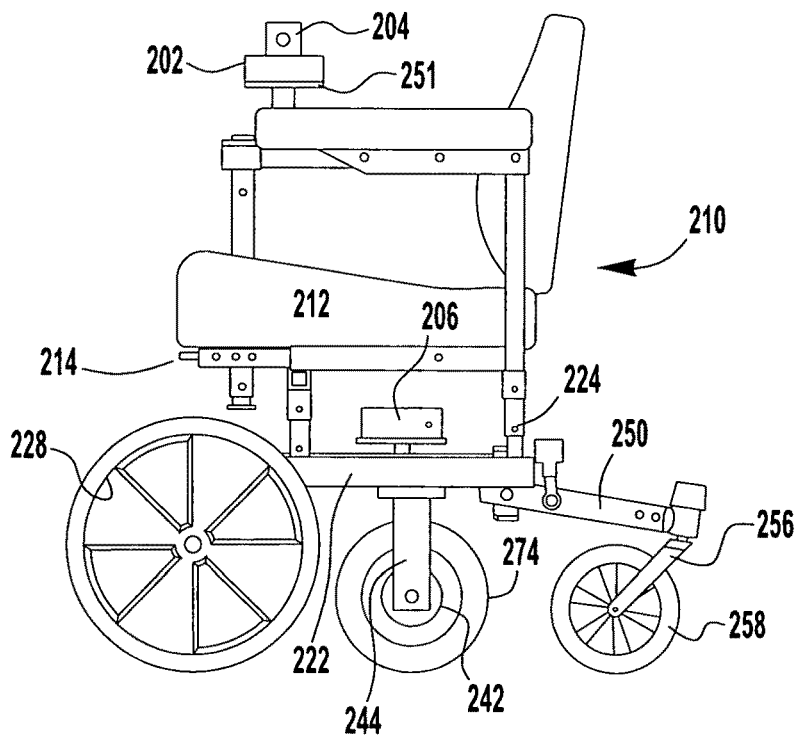
FIG. 21 shows a left side view of the HyPoV from FIG. 20.
Figure 22:
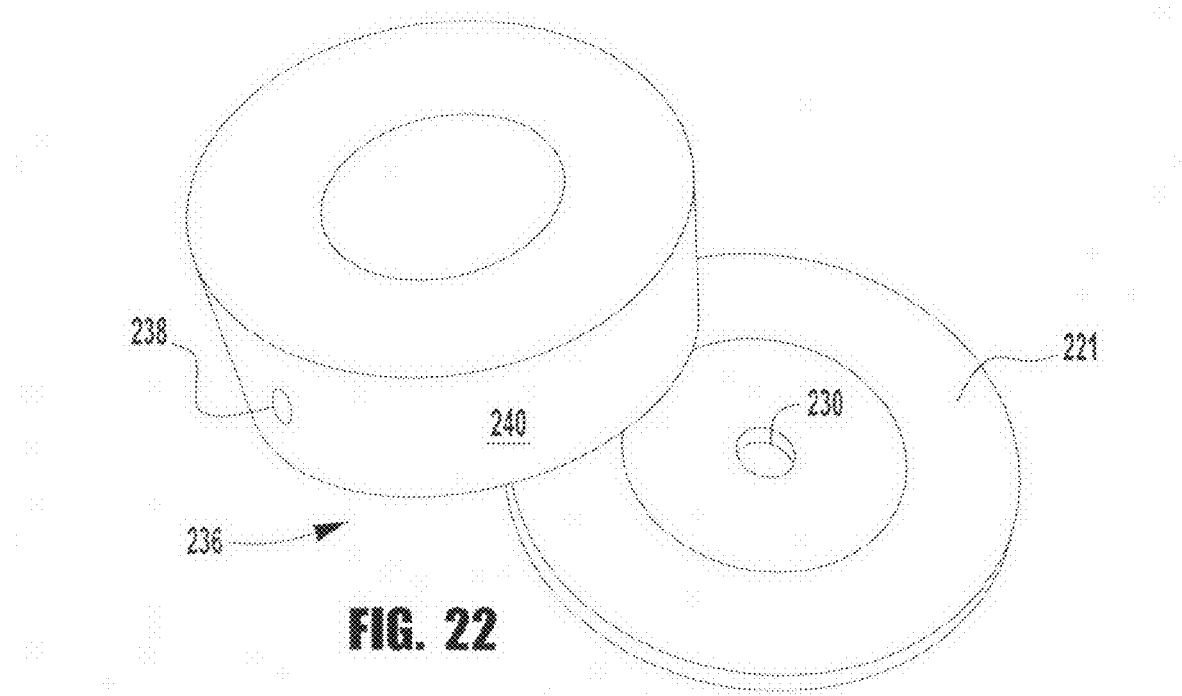
FIG. 22 shows a top perspective view of the components to the nylon capped, upper steering drum from FIGS. 20 and 21.
Figure 23:
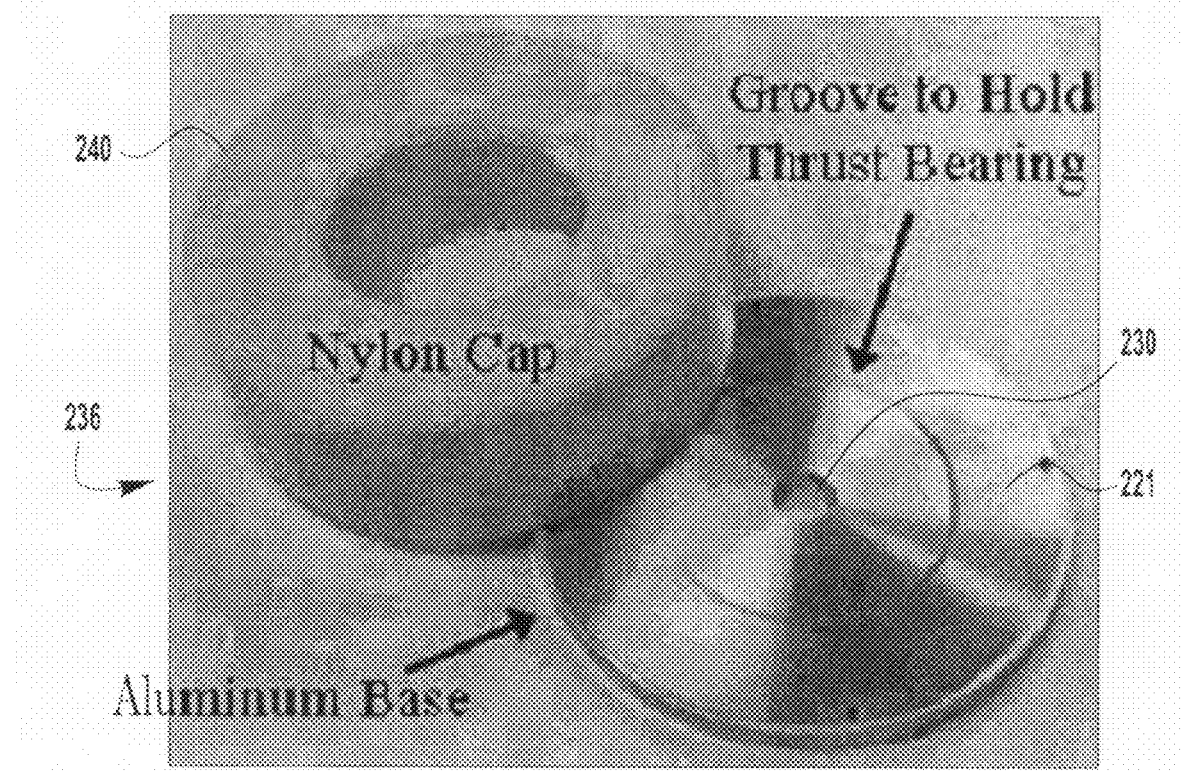
FIG. 23 is a photograph showing the upper steering drum from FIG. 22 assembled in its nylon capped housing.

In FIGS. 20 and 21, optional steering system 200 is comprised of two cylindrical drums, an upper steering drum 202 directly connected to the handlebars 204 operated by the user and a lower driven drum 206 attached by one or more cables 211 to the motor shaft of the center drive wheel, item 242 therein. When the user rotates the handlebar 204, the upper steering drum 202 rotates the same amount and tensions the cables 211 wrapped around the lower driven drum 206. These cables 211 also wrap around the lower driven drum 206, causing that lower driven drum 206 and drive wheel 242 to turn. Stiffness in turning either drum may be reduced by placing a thrust bearing 243 over a housing base, element 221 in FIGS. 18, 19, 22, 23 and 24B. The thrust bearing 243 interfaces with disks 213, 215 and 217 stacked on a center shaft 227 connected to housing base 221. These disks 213, 215 and 217 are spaced apart with one or more intermediate washers 219. Stiffness in the upper steering drum 202 can be further decreased by placing a bushing 223 over the center shaft 227 to interface with the center hole 230 in the housing base 221 of drum 206.

Drums 202 and 206 can be protected by an outer housing 236 composed of a cylindrical nylon cap 240 over an aluminum housing base 221. The cables 211 pass through holes 238 in the side of the housing 236. A pair of cable through-holes 238 is located on the right and left hand sides of the housing 236. One pair of cable through-holes 238 would be located such that a cable 211 wrapped around the mean of the two smallest washer diameters can pass through the holes 238 in a straight line. The other pair of cable through-holes 238 act similarly for a cable 211 wrapped around the mean of the two largest diameter washers 219. Ideally, there would be four pairs of through-holes 238 for each of the washer sizes of the upper drum 202. But, in this embodiment, averages were taken of the two smallest and two largest washer sizes due to space restrictions. The two pairs of through-holes 238 are placed on opposite sides of the housing 236 so the latter can be rotated 180 degrees to accommodate cables wrapped around various washer sizes. For the upper steering drum 202, the housing 236 allows a piece of the center shaft 227 to attach the handlebars 204 for passing through the top of the housing cap and rotate freely.

Also in FIGS. 20 and 21, elements common with earlier embodiments are commonly numbered in the 200 series. These include the HyPoV device proper 210, the seat 212, frame 214, frame front rail 220 and side rail 222, seat perch 224, axle 226, large wheels 228, drive wheel 242, fork 244 and tire 274, suspension link 250, caster wheel fork 256 and caster wheel 258.

The foregoing optional drum-cable steering system 200 can reduce costs of production in several ways. First, it replaces the expensive rack-and-pinion RP device. It also eliminates the need for expensive push/pull cables since the cables 211 of this steering alternative will remain in constant tension against the drums (see FIGS. 19, 24A and 24B).

With drums 202 and 206, and cables 211, versus a center steering column (like those found on many scooters), the upper handlebar 204 this alternate steering system 200 can be placed at different locations, i.e., the right-hand side, left-hand side or center of the HyPoV 210. When placed to one side, the handlebar 204 may act like the steering tiller for the basic HyPoV above. On either side, such a drum-cable system presents less interference than a center steering column. When the upper drum 202 is attached to a platform 251 extending across one or more armrests (see FIGS. 20 and 21), that platform 251 can retract for easier user transfers in and out of the device.

Figure 18:
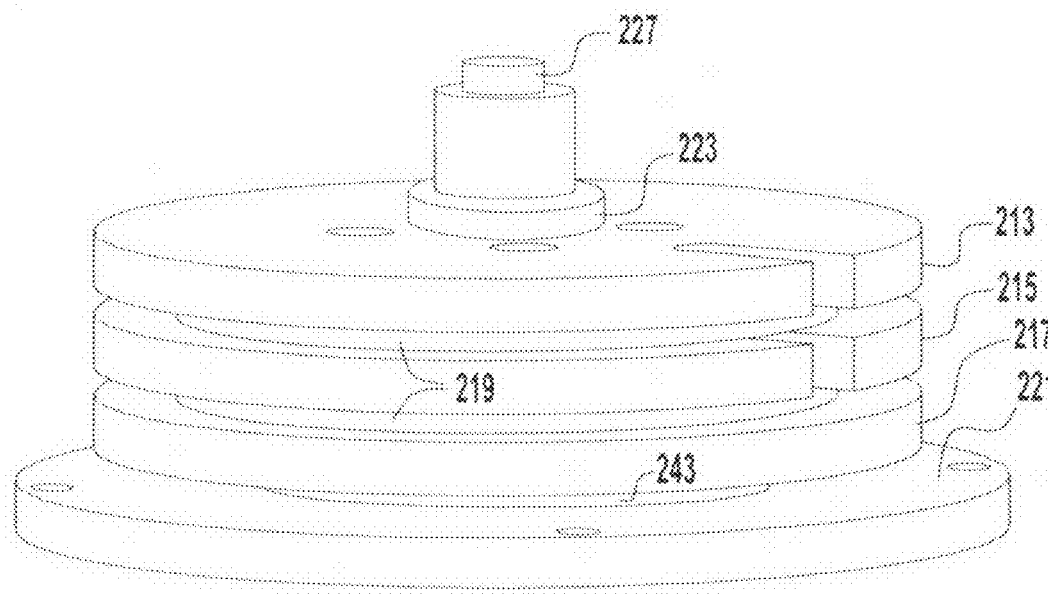
FIG. 18 shows a front perspective view of a mostly metallic upper steering drum for one embodiment of this HyPoV.

Referring to FIGS. 18 and 19, variations in user strength are accommodated by the variable gear ratios of the optional steering system 200. The steering drums 202 and 206 for same can be modular; made up of three equally-sized disks 213, 215 and 217 with a circular washer 219 located between the top and middle disks 213 and 215, and between the middle and bottom disks 215 and 217. Since the steering cables 211 wrap around the washers 219, different diameter washers can be interchanged to create various gear ratios between the steering drum 202 and driven drum 206. The ratio between the diameters of the two drums 202 and 206 determines the ratio between the angular displacements of the drums. The inverse of the angular displacement ratio is the torque ratio.

The optional steering system 200 has many advantages. The mechanism is less stiff, simpler to operate with rotary-to-rotary motion, and less expensive to make. The system still adjusts for variations in user strength and user preferences while also allowing for easy user transfers in and out of the wheelchair. Significantly, the user can now employ a pushing or pulling motion for steering, thereby increasing accessibility. And, most of the components are designed to be far stronger than required for common use.

Many components of the optional steering system 200 from FIGS. 18 through 24B can be further modified. For instance, the aluminum disks 213, 215 and 217 and washers 219 can be replaced with steel; the nylon housing cap 236 can be manufactured from other types of plastic; and currently machined disks and washers can be replaced with stamped or die-cast equivalents. For a large production scale, the drums 206 can be cast as one piece with one washer size. That would allow the modularity of gear ratios to be maintained by switching entire drums instead of washers.

In FIGS. 20 and 21, the platform 251 that holds the upper steering drum 202 is fixed to the armrests with a hinge attachment to one armrest and a fastener to the other, neither is shown. This arrangement allows the platform 251 to open up and swing out of the user's way for transfers. That hinge attachment may open between 90 and 360 degrees, and preferably about 270 degrees, so that the platform 251 may align substantially vertically with the wheelchair proper. The fastener that holds the platform 251 is strong, but an accessible and an easy-to-use device since the user must be able to operate it quite often. A quick-release pin or latch system (not shown) can also be used optionally therewith.

Still other improvements to the optional drum-cable steering mechanism 200 can be implemented. The washers 219, or entire drums 202 or 206, can be modified to non-circular or elliptical shapes (not shown) for changing the relationship between the angle steered and angle driven with the ratio depending on the angular position of the steering drum. For instance, when the upper steering drum 202 is turned to a small angle, the driven drum 206 responds very little and adds stability for when the user steers straight. Then, when the steering drum 202 is turned to a large angle, the driven drum 206 responds greatly for creating a sharp turn.

An automatic steering embodiment is one where an electric actuator supplies either all of the turning force or assists the manual system. In an embodiment which supplies all of the turning force, a switch system (such as a joystick) can be used to control the device's direction and speed.

In FIGS. 5C and 5D, 7B, 9 and 10, this embodiment of HyPoV 10 has at least one, but preferably two, batteries B to provide power to the hub-motor. The batteries B are usually located between a side frame rail 22 and the center swing arm 34. Optionally, the batteries B can be located at a different location on the HyPoV 10. The batteries B are usually mounted to the HyPoV 10 with support brackets (not shown) such that the swing arm 34 can rotate and move between them. The battery support brackets can optionally be replaced with a frame with integral support brackets for reducing the weight and number of fasteners needed on the HyPoV 10.

Any battery B known to those skilled in the art is adaptable for the HyPoV 10. Such batteries should be able to hold a charge longer than conventional wheelchair batteries in that the HyPoV only needs to power one centralized drive motor.

The HyPoV 10 can easily be broken down by removing the seat 12 and transporting in a standard passenger vehicle. A quick disconnect means (not shown) can optionally be used to connect the seat 12 to its perches 24 or frame 14. The seat 12, in one embodiment, is reversible to allow for easy seat orientation reversal using the quick disconnect.

A standard scooter controller can be used in this invention to provide directional (forward/reverse), speed control (acceleration and/or deceleration) and braking controls. The controller can optionally (and preferably) be a programmable controller specified for the motor by its manufacturer. The programmable controller adds the programmability necessary to tune the dynamic stability through control of the acceleration and braking.

Figure 16:
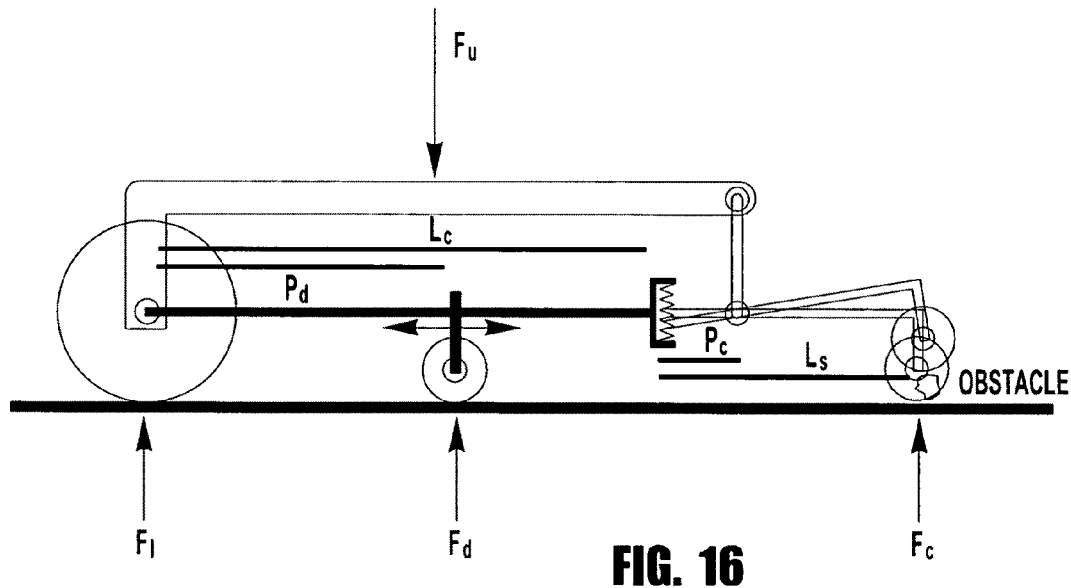
FIG. 16 schematically shows the mechanical forces exerted on the drive wheel of this HyPoV verses the forces exerted along the elongated center swing arm of same when contacting an obstacle.
Figure 17:
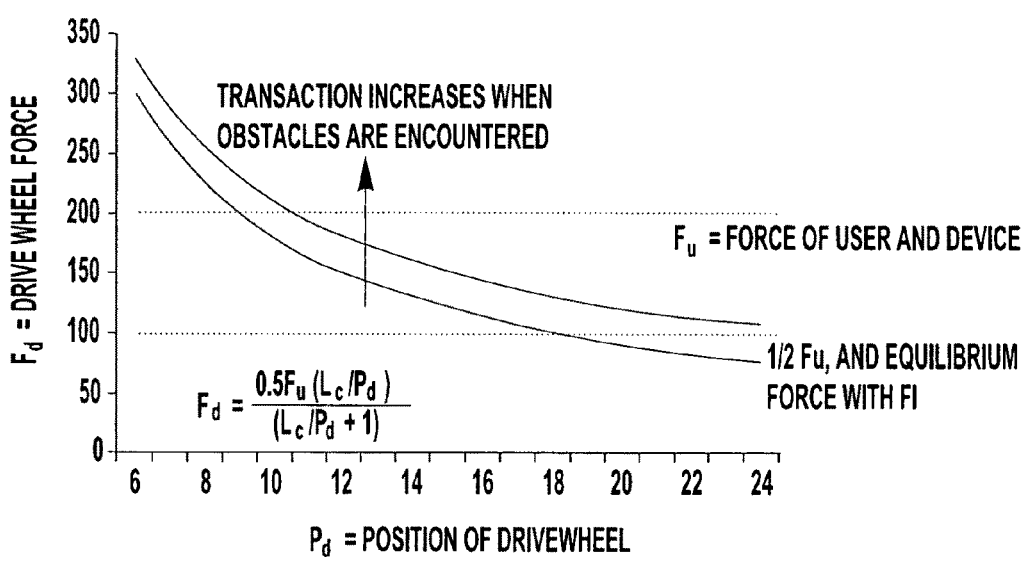
FIG. 17 graphically shows the change in drive wheel forces to be observed versus relative distance (i.e. positioning) of an HyPoV drive wheel along the elongated center swing arm for one embodiment of this invention, before and after an obstacle is encountered.

FIGS. 16 and 17 show the force encountered by each wheel when a user's weight is about 200 lbs. The example graphs the position of drive wheel ($P_d$) verses the force exerted on that drive wheel ($F_d$). As is demonstrated in the graph at FIG. 17, the force on the drive wheel ($F_d$) and in turn, the traction, increases as the drive wheel slides closer to the two large wheels (in this case at the rear of the HyPoV). Furthermore, when the HyPoV caster encounters an obstacle, the drive wheel force ($F_d$) increases regardless of $P_d$ as shown by the upper curve in FIG. 17. That demonstrating how the suspension system of this invention pro-actively increases traction when encountering rough terrain thus affording better maneuverability in that type of terrain. FIG. 17 also details the force-transferring ability of a pivot connection, slidable drive wheel, and center swing arm with suspension links (see FIGS. 10 through 12). In FIG. 17, the full weight of the combined user and device ($F_u$), and one half of that full combined weight are also plotted for reference. If a typical 4-wheel power wheelchair system were to be graphed, the drive-wheel force would be approximately ½ $F_u$, which is rarely the case in the system described here (and limits traction). Note that the parameters used in this plot, while realistic, are in no way fixed. The graph is meant to demonstrate the behavior of the force-amplifying virtues of one embodiment of suspension system herein. Parameters, such as, the swing-arm length, the suspension link length, and the location of the pivot for connecting the suspension links and frame, can be optimized.

While the present invention is disclosed above on a wheelchair type device, it can also be adapted for a personal recreational device having a similar suspension system and central drive wheel. The device can also optionally be made for one or more users. The present invention can also apply to individuals without disabilities, in a non-recreation usage.

We claim:

1. A personal vehicle having improved maneuverability on rough terrain and when encountering obstacles and comprising:
    a frame having a top and bottom section, the top section having a seat disposed thereon, the bottom section having a front, a rear and two side portions;
    two large, non-drive wheels positioned at one end of said frame and connected to each other with an axle;
    a pivot connection attached near a midpoint of said axle;
    an elongated swing arm attached to said pivot connection and to the front of the frame bottom section;
    a main drive wheel rotatably mounted in a fork attached to said swing arm intermediate the front and rear frame bottom sections and further intermediate the two side portions of said frame bottom section;
    a suspension system extending outwardly from said swing arm; and
    two caster wheels positioned in wheel forks rotatably attached to said suspension system.

2. The personal vehicle of claim 1, wherein said main drive wheel is powered by a hub-motor.

3. The personal vehicle of claim 1, which further comprises a braking system for said main drive wheel or at least one of said large wheels.

4. The personal vehicle of claim 1, wherein said main drive wheel is mounted equally between the two side portions of said frame bottom section.

5. The personal vehicle of claim 1, further comprising a tiller steering system.

6. The personal vehicle of claim 1, further comprising one or more batteries mounted to the frame.

7. The personal vehicle of claim 1, wherein the suspension system includes a suspension link for each caster wheel.

8. The personal vehicle of claim 1, wherein the suspension system includes a leaf spring for each caster wheel.

9. The personal vehicle of claim 1, wherein the large wheels are positioned toward the front of said personal vehicle.

10. A personal vehicle having improved maneuverability on rough terrain and when encountering obstacles and comprising:
    a frame having a top and bottom section, the top section having a seat disposed thereon;
    two large, non-drive wheels positioned at a front or rear end of said frame, wherein said two large wheels are interconnected by an axle;
    a pivot connection attached to said axle;
    an elongated center swing arm attached to said pivot connection at a first end and toward the front of said frame at a second end;
    a main drive wheel rotatably mounted to said center swing arm;
    a tiller steering mechanism connected to said main drive wheel;
    a suspension system extending outwardly from one end of said center swing arm; and
    two caster wheels positioned in separate forks rotatably attached to said suspension system.

11. The personal vehicle of claim 10, wherein said main drive wheel includes a hub-motor for powering said personal vehicle.

12. The personal vehicle of claim 10, further comprising a braking system for one or more of said main drive wheel and said large, non-drive wheels.

13. The personal vehicle of claim 10, further comprising a steering lever mounted on said seat.

14. The personal vehicle of claim 10, wherein said tiller steering mechanism is mounted to said frame top.

15. The personal vehicle of claim 10, further comprising one or more foot-rests.

* * * * *